United States Patent [19]
Akagiri

[11] Patent Number: 5,774,844
[45] Date of Patent: Jun. 30, 1998

[54] METHODS AND APPARATUS FOR QUANTIZING, ENCODING AND DECODING AND RECORDING MEDIA THEREFOR

[75] Inventor: Kenzo Akagiri, Kanagawa, Japan

[73] Assignee: Sony Corporation, Tokyo, Japan

[21] Appl. No.: 464,787

[22] PCT Filed: Nov. 9, 1994

[86] PCT No.: PCT/JP94/01888

§ 371 Date: Jun. 22, 1995

§ 102(e) Date: Jun. 22, 1995

[87] PCT Pub. No.: WO95/13660

PCT Pub. Date: May 18, 1995

[30] Foreign Application Priority Data

Nov. 9, 1993 [JP] Japan .................................. 5-279383
Nov. 17, 1993 [JP] Japan .................................. 5-288096

[51] Int. Cl.[6] ............................................. G10L 9/00
[52] U.S. Cl. ........................ 704/230; 704/215; 704/226; 704/229
[58] Field of Search ............................... 395/239, 2.24, 395/2.35, 2.38, 2.92, 2.95

[56] References Cited

U.S. PATENT DOCUMENTS

| 4,184,049 | 1/1980 | Crochiere et al. ........................ 381/31 |
| 4,455,649 | 6/1984 | Esteban et al. ............................ 370/80 |
| 4,535,472 | 8/1985 | Tomcik .................................... 381/31 |

(List continued on next page.)

FOREIGN PATENT DOCUMENTS

| 0 145 788 A1 | 6/1985 | European Pat. Off. ........ H04B 12/02 |
| 0 255 111 A2 | 2/1988 | European Pat. Off. ........ G11B 20/10 |
| 0 409 248 A2 | 1/1991 | European Pat. Off. ......... H03M 7/30 |
| 0 420 745 A2 | 4/1991 | European Pat. Off. ......... H04B 1/66 |
| 0 421 259 A2 | 4/1991 | European Pat. Off. ......... H04B 1/66 |
| 0 424 016 A2 | 4/1991 | European Pat. Off. ......... H04B 1/66 |
| 0 446 031 A2 | 6/1991 | European Pat. Off. . |
| 0 458 645 A2 | 11/1991 | European Pat. Off. ......... H04B 1/66 |
| 0 466 190 A2 | 1/1992 | European Pat. Off. ........ G11B 20/10 |
| 0 473 367 A1 | 3/1992 | European Pat. Off. ......... H03M 7/30 |
| 0 525 809 A2 | 7/1992 | European Pat. Off. ......... H04B 1/66 |
| 0 506 394 A2 | 9/1992 | European Pat. Off. ......... G10L 7/00 |
| 0653846 A1 | 5/1995 | European Pat. Off. ......... H03M 7/30 |
| 61-278213 | 12/1986 | Japan . |
| 1-162420 | 6/1989 | Japan . |
| 3-256411 | 11/1991 | Japan . |
| 3-263926 | 11/1991 | Japan . |

OTHER PUBLICATIONS

Gersho et al., (Advances in Speech Signal Processing, Eds. Furui and Sondhi, Dekker 1991, "Vector Quantization Techniques in Speech Coding", pp. 49–84), Jan. 1991.

K. Brandenburg, et al, "ASPEC: Adaptive Spectral Perceptual Entropy Coding of High Quality Music Signals," AES, 90th Convention 1991 Feb. 19–22, Paris, pp. 1–10 and Figs. 1 and 2.

G. Davidson, et al., "Low–Complexity Transform Coder for Satellite Link Applications," AES, 89th Convention 1990 Sep. 21–25 Los Angeles, pp. 1–22.

J. D. Johnson, "Transform Coding of Audio Signals Using Perceptual Noise Criteria," IEEE Journal on Selected Areas in Communication, vol. 6, No. 2, Feb. 1988, pp. 314–323.

(List continued on next page.)

*Primary Examiner*—David R. Hudspeth
*Assistant Examiner*—Vijay B. Chawan
*Attorney, Agent, or Firm*—Limbach & Limbach L.L.P.

[57] ABSTRACT

In this invention, in quantizing time region samples or frequency region samples of an input signal, an audio signal, etc., an approach is employed to allow a MDCT coefficient as the frequency region sample to undergo block floating processing. Thereafter, the processed MDCT coefficient is quantized to generate a first quantized value which is utilized calculate a quantization error between the first quantized value and the MDCT coefficient each quantization error is individually generated using one sample. The quantization error is then utilized to generate a second quantized value to thereby decompose the MDCT coefficient into at least two words. Thus, in accordance with this invention, degradation of sound quality can be minimized, and backward compatibility can be ensured.

43 Claims, 16 Drawing Sheets

U.S. PATENT DOCUMENTS

| | | | |
|---|---|---|---|
| 4,538,234 | 8/1985 | Honda et al. | 364/513.5 |
| 4,748,579 | 5/1988 | Zibman et al. | 364/726 |
| 4,809,274 | 2/1989 | Walker et al. | 371/37 |
| 4,811,396 | 3/1989 | Yatsuzuka | 395/2.39 |
| 4,862,186 | 8/1989 | Beard | 341/140 |
| 4,896,362 | 1/1990 | Veldhuis et al. | 381/30 |
| 4,912,763 | 3/1990 | Galand et al. | 381/31 |
| 4,932,062 | 6/1990 | Hamilton | 381/43 |
| 4,949,168 | 8/1990 | Ninomiya et al. | |
| 4,972,484 | 11/1990 | Theile et al. | 381/37 |
| 5,049,992 | 9/1991 | Citta et al. | 358/140 |
| 5,105,463 | 4/1992 | Veldhuis et al. | 381/30 |
| 5,109,417 | 4/1992 | Fielder et al. | 381/36 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 358/133 |
| 5,142,656 | 8/1992 | Fielder et al. | 381/37 |
| 5,151,941 | 9/1992 | Nishiguchi et al. | 381/46 |
| 5,157,760 | 10/1992 | Akagiri | 395/2 |
| 5,166,686 | 11/1992 | Sugiymama | 341/155 |
| 5,185,800 | 2/1993 | Mahieux | 381/29 |
| 5,204,677 | 4/1993 | Akagiri et al. | 341/118 |
| 5,222,189 | 6/1993 | Fielder | 395/2 |
| 5,241,603 | 8/1993 | Akagiri et al. | 381/37 |
| 5,285,476 | 2/1994 | Akagiri et al. | 375/25 |
| 5,285,498 | 2/1994 | Johnston | 381/2 |
| 5,294,925 | 3/1994 | Akagiri | 341/50 |
| 5,301,205 | 4/1994 | Tsutsui et al. | 375/1 |
| 5,311,561 | 5/1994 | Akagiri | 375/122 |
| 5,375,189 | 12/1994 | Tsutsui | 395/2.38 |
| 5,381,143 | 1/1995 | Shimoyoshi et al | 341/51 |
| 5,394,508 | 2/1995 | Lim | 395/2.38 |
| 5,438,643 | 8/1995 | Akagiri et al. | 395/2.1 |
| 5,461,378 | 10/1995 | Shimoyoshi et al. | 341/51 |
| 5,490,130 | 2/1996 | Akagiri | 369/124 |
| 5,493,296 | 2/1996 | Sugihara | 341/76 |
| 5,581,653 | 12/1996 | Todd | 395/2.38 |

OTHER PUBLICATIONS

E.F. Schröder, et al., "High Quality Digital Audio Encoding with 3.0 Bits/Sample using Adaptive Transform Coding," AES, 80th Convention 1986 Mar. 4–7 Montreux, Switzerland, pp. 1–7.

D. Esteban, et al., "Application of Quadrature Mirror Filters to Split Band Voice Coding Schemes," 1977 IEEE International Conference on Acoustics, Speech & Signal Processing, pp. 191–195.

G. Stoll, et al., "Masking–Pattern Adapted Subband Coding: Use of the Dynamic Bit–Rate Margin," AES, 8th Conference 199 Mar. 1–4 Paris, pp 1–33

J.H. Rothweiler, "Polyphase Quadrature Filters—A New Subband Coding Technique," 1983 IEEE, ICASSP 83, Boston, pp. 1280–1283.

R.E. Crochiere, et al., "Digital Coding of Speech in Sub–bands," 1976 American Telephone and Telegraph Company, The Bell System Technical Journal, vol. 55, No. 8, Oct. 1976, pp. 1069–1085.

R. Zelinski, et al., "Adaptive Transform Coding of Speech Signals," IEEE Transactions on Acoustics, Speech and Signal Processing, vol. ASSP–25 No. 4 Aug. 1977, pp. 299–309.

M.A. Krasner, "The Critical Band Coder—Digital Encoding of Speech Signals Based on the Perceptual Requirements of the Auditory System," IEEE, ICASSP Proceedings 1980, pp. 327–331.

G. Theile, et al., "Low bit–rate coding of high–quality audio signals—An introduction to the MASCAM system," EBY Review/Technical, 1988 Aug., No. 230, Brussels, Belgium, pp. 158–181.

Y. Mahieux, et al., "Transform Coding of Audio Signals at 64 Kbit/s," 1990 IEEE, Globecom '90, IEEE Global Telecommunications Conference & Exhibit, pp. 0518–0522.

"Subband/Transform Coding Using Filter Bank Designs Based on Time Domain Aliasing Cancellation", Princen et al. 1987 IEEE pp. 2161–2164.

"Adaptive Transform Coding of Speech Signals", Zelinski et al.—IEEE Transactions on Acoustics, Speech and Signal Processing, vol. ASSP–25. No. 4, Aug. 1977, pp. 299–309.

"The Critical Bank Coder—Digital Encoding of Speech Signals Based on the Perceptual Requirements of the Auditory System", Michael Krasner, IEEE vol. 1–3, 1980, pp. 327–331.

"Adaptive Transform Coding with an Adaptive Block Size (ATC–ABS)", Sugiyama et al. Apr. 3–6, 1990 IEEE pp. 1093–1096.

METHODS AND APPARATUS FOR QUANTIZING, ENCODING AND DECODING AND RECORDING MEDIA THEREFOR

TECHNICAL FIELD

This invention relates to an efficient encoding apparatus and to an efficient encoding method for carrying out reduction of bit rate, for use in cinema film projection systems or stereo or so called multi-surround acoustic systems such as video tape recorder or video disc player, etc., a quantizing apparatus and a quantizing method used in such encoding apparatus and method, recording media adapted so that signals quantized by such quantizing apparatus or efficient encoding apparatus are recorded thereonto or thereinto, an efficient code decoding apparatus for decoding quantized signals reproduced such recording media, and a decoding apparatus used in such an efficient code decoding apparatus.

BACKGROUND ART

There are various efficient encoding techniques and apparatuses for audio signals or speech signals, etc. For example, there is a transform encoding system which utilizes a blocking frequency band division system of dividing an audio signal, etc. in the time domain into blocks for every time unit transforming (orthogonally transform) signals in the time domain every respective blocks into signals on the frequency domain to divide such signals into signals (signal components) in a plurality of frequency bands to encode them every respective bands; a Sub Band Coding (SBC) system which is the non-blocking frequency band division system of dividing, every unit times, an audio signal, etc. in the time region into signals (signal components) in a plurality of frequency bands without carrying out blocking thereof to encode them, and the like. Moreover, there have been also proposed an efficient encoding technique and an efficient encoding apparatus in which the Sub Band Coding (SBC) system and the transform encoding system described above are combined. In this case, e.g., an approach is employed to carry out band division by the Sub Band Coding (SBC) thereafter to orthogonally transform signals every respective bands into signals in the frequency band by the transform encoding system to implement encoding to the orthogonally transformed signals every respective bands.

Here, as a filter for band division used in the above-described Sub Band Coding (SBC) system, there is, e.g., a filter such as QMF (Quadrature Mirror filter), etc. Such filter is described in 1976 R. E. Crochiere Digital coding of speech in subbands Bell Syst. Tech. J. Vol. 55, No. 8 1976. Moreover, in ICASSP 83, BOSTON Polyphase Quadrature filters-A new subband coding technique Joseph H. Rothweiler, a technique and an apparatus for band division using filter of equal bandwidth such as Polyphase Quadrature filter, etc. are described.

Further, as the above-described orthogonal transform processing, e.g., there is such an orthogonal transform processing to divide an input audio signal into blocks every predetermined unit time (frame) to carry out, every respective blocks, Fast Fourier Transform (FFT), Discrete Cosine Transform (DCT), or Modified DCT (MDCT), etc. to thereby transform signals on the time base into signals on the frequency base. The above-mentioned MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

In addition, as a frequency division technique in the case of quantizing respective frequency components which have been caused to undergo frequency band division, there is, e.g., a band division in which the hearing sense characteristic of the human being is taken into consideration. Namely, there are instances where an audio signal is divided into signal components in plural (e.g., 25) bands by bandwidths such that according as frequency shifts to higher frequency band side, bandwidths become broader, which are generally called critical bands. Moreover, in encoding data every respective bands at this time, a predetermined bit allocation is carried out every respective bands, or an adaptive bit allocation is carried out every respective bands. Thus, encoding is carried out. For example, in encoding, by the bit allocation, MDCT coefficient data obtained after undergoing the MDCT processing, encoding is carried out by adaptive allocation bit numbers with respect to MDCT coefficient data for every respective band obtained by MDCT processing for every respective block.

As the bit allocation technique and an apparatus therefor, the following technique and apparatus are known.

In IEEE Transactions of Acoustics, Speech, and Signal Processing, vol. ASSP-25, No. 4, Aug. 1977, it is described that bit allocation is carried out on the basis of magnitudes of signals every respective bands. Moreover, in ICASSP 1980 The critical band coder—digital encoding of the perceptual requirements of the auditory system M. A. Kransner MIT, there are described a technique and an apparatus in which the hearing sense masking is utilized to thereby obtain necessary signal-to-noise ratios every respective bands to carry out fixed bit allocation.

However, these bit allocation technologies have been developed in anticipation of the fact that reproduction (decode) is carried out at a fixed (predetermined) bit rate on the reproduction side (decode side). Accordingly, in the case where decode is carried out at a bit rate lower than the fixed bit rate, remarkable degradation in sound quality would result.

Namely, in such cases that, e.g., a portion of bits after undergoing encode processing on the encode side is diverted to another data transfer in order to carry out decode operation by using a bit rate lower than a bit rate which was used at the time of encode operation, decode operation would be carried out at a bit rate below the bit rate at the time of encode operation on the decode side. For this reason, with the above-described known bit allocation technology which expects to carry out decode operation at a bit rate at the time of encode operation on the decode side, remarkable degradation in sound quality would result at the time of reproduction (decoding).

Moreover, in such cases that, e.g., a reproducer adapted for carrying out reproduction at a lower bit rate was already used, even if an attempt is made to introduce a system of good sound quality using a higher bit rate, satisfactory reproduction cannot be conducted with such a reproducer adapted for carrying out reproduction at the lower bit rate which was already used.

Namely, in the conventional bit allocation technology, there was no backward compatibility (compatibility from lower level equipments).

In addition, in such cases of recording information in which speech, or audio signals, etc. are encoded into a storage (recording) medium using a memory device, such as, for example, so called IC card, because the memory device is expensive, it is required that a longer time recording is carried out, and it is also required that degradation in sound quality is minimized.

SUMMARY OF THE INVENTION

An object of this invention is to provide a system including an efficient encoding apparatus and an efficient encoding method which can hold degradation in sound quality as described above down to a minimum level and has backward compatibility as well, a quantizing apparatus and a quantizing method used in such encoding apparatus and method, and an efficient code decoding apparatus, a decoding apparatus and recording media corresponding thereto or adapted therefor.

Another object of this invention is to provide an efficient encoding apparatus and an efficient encoding method adapted so that in where cases recording is carried into a storage (recording) medium using an expensive memory device, they are capable of suitably reducing, e.g., in order to prolong recording time from an initial set time for long time recording, bit rate of encode information which has been already recorded or is being recorded to prolong such a recording time, and of minimizing degradation in sound quality at that time, a quantizing apparatus and a quantizing method used in such encoding apparatus and method, and an efficient code decoding apparatus, a decoding apparatus and recording media corresponding thereto or adapted therefor.

A further object of this invention is to provide a low cost decoding apparatus or a low cost efficient code decoding apparatus adapted so that in the case where a reproducing apparatus for signals quantized by the quantizing apparatus or the efficient encoding apparatus (decoding apparatus or efficient code decoding apparatus for reproducing signals from recording media to decode them) is constituted, e.g., cheap and commonly used plural decoders for carrying out bit allocation by using a bit rate less than a fixed value are used so that a reproducing apparatus as described above can be prepared (constituted), thereby making it unnecessary to prepare (fabricate) a new LSI (Large Scale Integrated circuit) for the decoder so that cost can be suppressed (reduced).

This invention has been proposed in order to attain the above-described objects. A quantizing apparatus of this invention includes at least one quantizing function adapted to quantize time region samples obtained by frequency-decomposing an audio, speech or picture time signal by means of a filter, or frequency region samples obtained by orthogonally transforming frequency-decomposed time region samples, or directly orthogonally transforming an input time signal as described above thereafter to further quantize, individually by one sample, each quantization (quantizing) error of the preceding stage to thereby decompose the time region sample or the frequency region sample into at least two words. At this time, employment of an approach in which word lengths of respective words are determined in advance makes it unnecessary to send word length information from the encoder (quantizing apparatus) to the decoder (decoding apparatus), and is therefore effective for reduction of bit rate. Of course, word length information may be sent so that an adaptive word length can be provided. In such quantization, round-off operation is carried out so that quantizing (quantization) noises are reduced.

Moreover, in the quantizing apparatus of this invention, an output bit rate of at least one quantizing function is caused to be a fixed bit rate in predetermined time units, or output bit rates of all the quantizing functions are caused to be a fixed bit rate in predetermined time units. In such case, time region samples or frequency region samples are caused to undergo block floating every plural samples to determine, from a scale factor for a quantized output of at least the preceding stage, a scale factor for sample data obtained by further quantizing a quantization error of the preceding stage.

In addition, in the quantizing apparatus of this invention, time region samples or frequency region samples are caused to undergo block floating every plural samples to determine, from a scale factor and a word length for a quantized output of at least the preceding stage, a scale factor for sample data obtained by further quantization a quantizing error of the preceding stage.

In the above-mentioned case, with respect to sample data within small blocks subdivided with respect to time and frequency, quantization having the same block floating and word length are carried out within the small blocks. Moreover, in order to obtain samples within the small blocks subdivided with respect to time and frequency, after non-blocking frequency analysis such as filtering, etc. is carried out, an output of the non-blocking frequency analysis such as filtering, etc. is caused to undergo blocking frequency analysis such as orthogonal transform processing, etc. At this time, the fact that frequency bandwidths of the non-blocking frequency analysis are the same at least in two bands of the lowest frequency band is useful for reduction of cost. Moreover, the fact that frequency bandwidths of the non-blocking frequency analysis are broader at least in the highest frequency band according as frequency shifts to higher frequency band side is important for utilization of the effect of the hearing sense based on the critical bands. Further, in the blocking frequency analysis, by adaptively altering (changing) corresponding block sizes by the time characteristic of an input signal, optimum processing corresponding to the time characteristic of the input signal can be made. Here, implementation of alteration of the block size independently every at least two output bands of the non-blocking frequency analysis is effective for preventing interference between frequency components to carry out optimum processing independently every respective band components.

Moreover, determination of bit allocation quantities given to respective channels by scale factors of respective channels or sample maximum value is effective for reduction of operations because such determination is conducted by a simple operation. In addition to the above, a method of varying bit allocation quantities given to respective channels by change in point of time of amplitude information represented by scale factors of respective channels is also profitable for lowering bit rate.

Further, the quantizing apparatus of this invention includes at least one quantizing function adapted to quantize time region samples, and to or frequency region samples thereafter to further quantize, individually by one sample, each quantization error of the preceding stage to thereby decompose the time region sample or the frequency region sample into at least two words to separate them every respective quantized outputs into one sync (synchronization) block. Thereafter, such quantized outputs are recorded onto or into recording media of this invention. The recording media thus recorded are decoded and reproduced by the decoding apparatus of this invention.

Moreover, another quantizing apparatus of this invention includes at least one quantizing function adapted to quantize time region samples, and or frequency region samples thereafter to further quantize, individually by one sample, each quantization error of the preceding stage to thereby decompose the time region sample or the frequency region sample into at least two words. Thereafter, respective quantized outputs are alternately recorded in order of frequency or time into one sync block with respect to recording media of this invention. Thereafter, the decoding apparatus of this invention carries out decode and reproduction operation from these time region samples or frequency region samples.

Further, a quantizing method of this invention quantizes a predetermined sample in the time region or frequency region of an input signal to generate a first quantized value to calculate a quantization error between the predetermined sample and the first quantized value to quantize the quantization error individually by one sample to generate a second quantized value.

Further, the quantizing method of this invention generates, by quantization based on round-off operation, at least one of the first quantized value and the second quantized value.

Further, the quantizing method of this invention outputs, at a fixed bit rate, at least one of the first quantized value and the second quantized value.

Further, the quantizing method of this invention outputs the first quantized value and the second quantized value so that total bit rate thereof is caused to be a fixed bit rate.

Further, the quantizing method of this invention allows predetermined samples as described above to undergo block floating processing by using a first scale factor for every block comprised of plural samples to normalize quantization errors as described above by a second scale factor determined on the basis of the first scale factor.

Further, the quantizing method of this invention determines the second scale factor on the basis of a word length in generating the first scale factor and the first quantized value.

In addition, the quantizing method of this invention is such that, with respect to sample data within small blocks subdivided with respect to time and frequency, normalization and quantization are carried out by the same scale factor and word length within the small blocks.

An efficient encoding apparatus of this invention includes at least one quantizing function adapted to quantize time region samples obtained by frequency-decomposing an audio, speech or picture time signal by means of a filter, or frequency region samples obtained by orthogonally transforming frequency-decomposed time region samples or directly orthogonally transforming an input time signal thereafter to further quantize, individually by one sample, each quantization error of the preceding stage to thereby decompose the time region sample or the frequency region sample into at least two words. At this time, employment of a method of determining word lengths of respective words in advance makes it unnecessary to send word length information from the encoder (encoding apparatus) to the decoder (decoding apparatus), and is therefore effective for reduction of bit rate. Of course, a method of sending word length information to allow the word length to be adaptive word length may be employed. In such quantization, round-off operation may be carried out so that quantization errors are reduced.

Moreover, in the efficient encoding apparatus of this invention, an output bit rate of at least one quantizing function is caused to be a fixed bit rate in predetermined time units, or output bit rates of all the quantizing functions are caused to be a fixed bit rate in predetermined time units. In such case, time region samples or frequency region samples are caused to undergo block floating every plural samples to determine, from a scale factor for a quantized output of at least the preceding stage, a scale factor for sample data obtained by further quantizing a quantization error of the preceding stage.

In addition, in the efficient encoding apparatus of this invention, time region samples or frequency region samples are caused to undergo block floating every plural samples to determine, from a scale factor and a word length for a quantized output of at least the preceding stage, a scale factor for sample data obtained by further quantizing a quantization error of the preceding stage.

In the above-mentioned case, with respect to sample data within small blocks subdivided with respect to time and frequency, quantization having the same block floating and word length are carried out within the small blocks. Moreover, in order to obtain samples within the small blocks subdivided with respect to time and frequency, after non-blocking frequency analysis such as filter, etc. is carried out, an output of the non-blocking frequency analysis such as filter, etc. is caused to undergo blocking frequency analysis such as orthogonal transform processing, etc. At this time, the fact that frequency bandwidths of the non-blocking frequency analysis are the same at least in two bands of the lowest frequency band is useful for reduction of cost. Moreover, the fact that frequency bandwidths of the non-blocking frequency analysis are broader at least in the highest frequency band according as frequency shifts to higher frequency band side is important for utilization of the effect of the hearing sense based on the critical bands. Further, in the blocking frequency analysis, by adaptively altering (changing) corresponding block sizes by the time characteristic of an input signal, optimum processing corresponding to the time characteristic of the input signal can be made. Here, implementation of alteration of the block size independently every at least two output bands of the non-blocking frequency analysis is effective for preventing interference between frequency components to carry out optimum processing independently every respective band components.

Moreover, determination of bit allocation quantities given to respective channels by scale factors of respective channels or sample maximum value is effective for reduction of operation because such determination is carried out by simple operation. In addition to the above, a method of varying bit allocation quantities given to respective channels by change in point of time of amplitude information represented by scale factors of respective channels is also profitable for lowering bit rate.

Further, the efficient encoding apparatus of this invention includes at least one quantizing function adapted to quantize time region samples or frequency region samples thereafter to further quantize, individually by one sample, each quantization error of the preceding stage to thereby decompose the time region sample or the frequency region sample into at least two words to separate them every respective quantized outputs into one sync (synchronization) block to record such quantized outputs onto or into recording media of this invention. The recording media thus recorded are decoded and reproduced by the efficient code decoding apparatus of this invention.

Moreover, another efficient encoding apparatus of this invention includes at least one quantizing function adapted to quantize time region samples or frequency region samples thereafter to further quantize, individually by one sample, each quantization error of the preceding stage to thereby decompose the time region sample or the frequency region sample into at least two words. Thereafter, respective quantized outputs are alternately recorded in order of frequency or time into one sync block with respect to recording media of this invention. Thereafter, the efficient code decoding apparatus of this invention carries out decode and reproduction operation from these time region samples or frequency region samples.

An efficient encoding method of this invention comprises the steps of: dividing a total bit allocation into a basic bit allocation and an additional bit allocation; quantizing a predetermined sample in the time region or the frequency region of an input signal by a word length based on the basic bit allocation to generate a first quantized value; calculating a quantization error between the predetermined sample and the first quantized value; and quantizing each quantizing error as described above individually by one sample to generate a second quantized value as the additional bit allocation.

Moreover, in the efficient encoding method of this invention, at least one of the first quantized value and the second quantized value is generated by quantization based on round-off operation.

Further, in the efficient encoding method of this invention, at least one of the first quantized value and the second quantized value is outputted at a fixed bit rate.

Further, in the efficient encoding method of this invention, the first quantized value and the second quantized value are outputted so that total bit rate thereof becomes equal to a fixed bit rate.

Further, in the efficient encoding method of this invention, the predetermined sample is caused to undergo block floating processing by using a first scale factor for every block comprised of plural samples to normalize quantizing errors as described above by a second scale factor determined on the basis of the first scale factor.

Further, in the efficient encoding method of this invention, the second scale factor is determined on the basis of a word length in generating the first scale factor and the first quantized value.

In addition, in the efficient encoding method of this invention, with respect to sample data within small blocks subdivided with respect to time and frequency, normalization and quantization are carried out by the same scale factor and word length within the small blocks.

Further, in accordance with this invention, by at least one quantizing function adapted to quantize time region samples or frequency region samples thereafter to further quantize, individually by one sample, each quantization error of the preceding stage, the time region sample or the frequency region sample is decomposed into at least two words. At this time, employment of a method of determining, in advance, word lengths of respective quantized words makes it unnecessary to send word length information from the encoder to the decoder, and is therefore effective for reduction of bit rate. Of course, word length information may be sent so that an adaptive word length is provided. In addition, in such quantization, implementation of round-off operation is effective for reduction of quantization errors.

Further, employment of an approach to allow an output bit rate of at least one quantizing function to be a fixed bit rate in predetermined time units, or employment of an approach to allow all bit rates of all the quantizing functions to be a fixed bit rate in predetermined time units is effective for simplification of the recording system onto a recording medium such as disc or tape, etc.

Further, in the above-mentioned case, employment of an approach to quantize sample data within small blocks subdivided with respect to time and frequency with the same block floating and word length within the small blocks is effective for realization of more efficient encoding. In such cases, employment of an approach to allow time region samples or frequency region samples to undergo block floating every plural samples to determine, from scale factor for a quantized output of at least the preceding stage, scale factor for sample data obtained by quantizing a quantization error of the preceding stage, or an approach to determine, from scale factor and word length for quantized output of at least the preceding stage, scale factor for sample data obtained by further quantizing a quantization error of the preceding stage is effective for improvement in efficiency of efficient encoding.

Further, an approach is employed to carry out non-blocking frequency analysis such as by filtering, etc. in order to obtain samples within small blocks subdivided with respect to time and frequency thereafter to allow an output of the non-blocking frequency analysis such as by filtering, etc. to undergo blocking frequency analysis such as orthogonal transform processing, etc., whereby generation of quantizing (quantization) noises in which the hearing sense masking is taken into consideration can be made in the time region and the frequency region. Thus, frequency analysis preferable from a viewpoint of the hearing sense can be obtained. At this time, the fact that frequency bandwidths of the non-blocking frequency analysis are the same at least in two bands of the lowest frequency band is useful for reduction of cost. Moreover, the frequency bandwidths of the non-blocking frequency analysis are caused to be broader at least in the highest frequency band according as frequency shifts to higher frequency band side, thereby making it possible to efficiently utilize the effect of the hearing sense based on the critical bands. In the blocking frequency analysis, corresponding block sizes are adaptively altered (changed) by the time characteristic of an input signal, whereby optimum processing corresponding to the time characteristic of the input signal can be made. Moreover, employment of an approach to carry out alteration of block size independently every at least two output bands of the non-blocking frequency analysis is effective for preventing interference between frequency components to carry out optimum processing independently every respective band components.

Further, by calculating channel bit allocation by scale factors of respective channels, simplification of bit allocation calculation can be realized. Moreover, by at least one quantizing function to quantize time region samples or frequency region samples thereafter to further quantize, individually by one sample, each quantization error of the preceding stage to thereby decompose the time region sample or the frequency region sample into at least two words to separately record, for every respective quantized output, them into one sync block to decode and reproduce them is effective in that bit train portions to be removed can be collectively removed in the case of reproducing such recorded data at a bit rate caused to be lower.

In addition, by at least one quantizing function adapted to quantize time region samples or frequency region samples thereafter to further quantize, individually by one sample, each quantizing (quantization) noise of the preceding stage to decompose the time region sample or the frequency region sample into at least two words to alternately record respective quantized outputs in order of frequency or time into one sync block to carry out decode and reproduction operation from the time region samples or the frequency region samples is effective in that bit train portions to be removed can be collectively removed in a form to limit the frequency band in the case of reproducing recorded data at a bit rate caused to be lower.

BEST MODE FOR CARRYING OUT THE INVENTION

Preferred embodiments of this invention will now be described with reference to the attached drawings.

Figure 1:
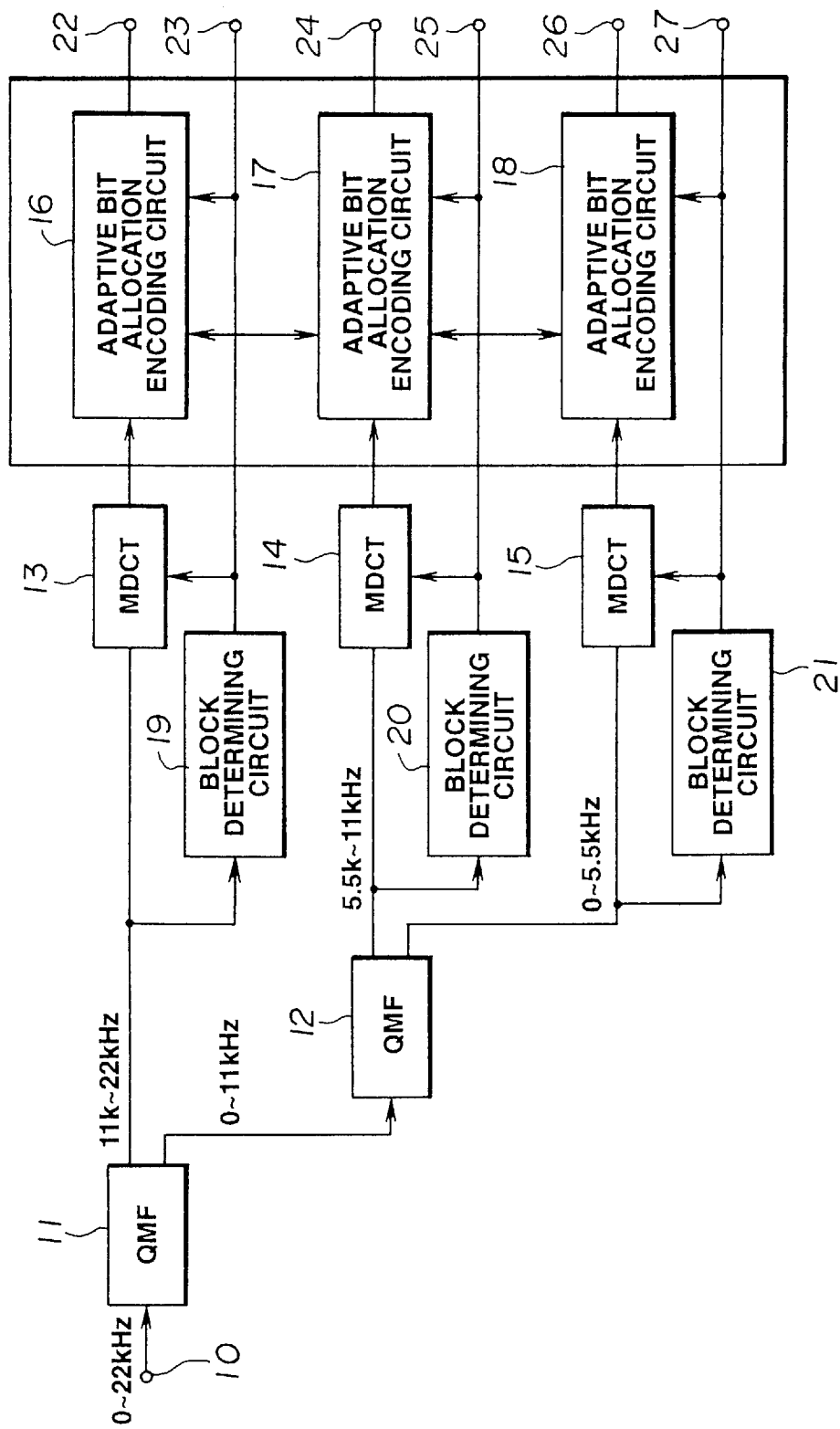
FIG. 1 is a block circuit diagram showing an example of the configuration of an efficient encoding apparatus to which a quantizing apparatus of an embodiment of this invention is applied.

In these embodiments, this invention is applied to an efficient encoding apparatus adapted for carrying out efficient encoding of an input digital signal such as an audio PCM Signal, etc. by using respective technologies of Sub Band Coding (SBC), Adaptive Transform Coding (ATC) and Adaptive Bit Allocation (APC-AB). FIG. 1 is a view showing an actual configuration of the efficient encoding apparatus to which this invention is applied.

In the efficient encoding apparatus shown in FIG. 1, an approach is employed to divide an input digital signal into signals in a plurality of frequency bands by means of a filter, etc., to carry out orthogonal transform processing for every respective frequency band to adaptively bit-allocate spectrum data on the frequency base thus obtained every the so called critical band in which the hearing sense characteristic of the human being is taken into consideration, which will be described later. At this time, in higher frequency bands, bands obtained by further dividing the critical bandwidths are used. As a matter of course, non-blocking frequency division widths by filter, etc. may be caused to be equal divisional widths.

Further, in this efficient encoding apparatus, an approach is employed to adaptively vary, prior to orthogonal transform processing, block size (block length) in dependency upon an input signal, and to carry out floating processing in critical band units or in units of bands obtained by further subdividing the critical bands in higher frequency bands. It should be noted that the critical bands are frequency bands divided by taking the hearing sense characteristic of the human being into consideration, and are defined as bands that noises of narrow bands having the same intensity in the vicinity of frequency of a certain pure sound have when the pure sound is masked by those noises. Such critical bands are such that according as frequency shifts to higher frequency band side, bandwidths become broader, and the entire frequency band of, e.g., 0~20 kHz is divided into, e.g., 25 critical bands.

Namely, in FIG. 1, input terminal 10 is supplied with an audio PCM signal of, e.g., 0~22 kHz. This input signal is divided into a signal in 0~11 kHz band and a signal in 11 k~22 kHz by means of a band division filter 11, e.g., so called QMF, etc. The signal in the 0~11 kHz band is divided into a signal in 0~5.5 kHz band and a signal in 5.5 k~11 kHz band similarly by means of a band division filter 12 such as so called QMF, etc.

The signal in the 11 k~22 kHz band from the band division filter 11 is sent to a MDCT (Modified Discrete Cosine Transform) circuit 13 which is an example of the orthogonal transform circuit, the signal in the 5.5 k~11 kHz band from the band division filter 12 is sent to a MDCT circuit 14, and the signal in the 0~5.5 kHz band from the band division filter 12 is sent to a MDCT circuit 15. These signals are caused to respectively undergo MDCT processing thereat. In respective MDCT circuits 13, 14, 15, MDCT processing are carried out on the basis of block sizes determined by block determining circuits 19, 20, 21 provided for every bands.

Figure 2A:
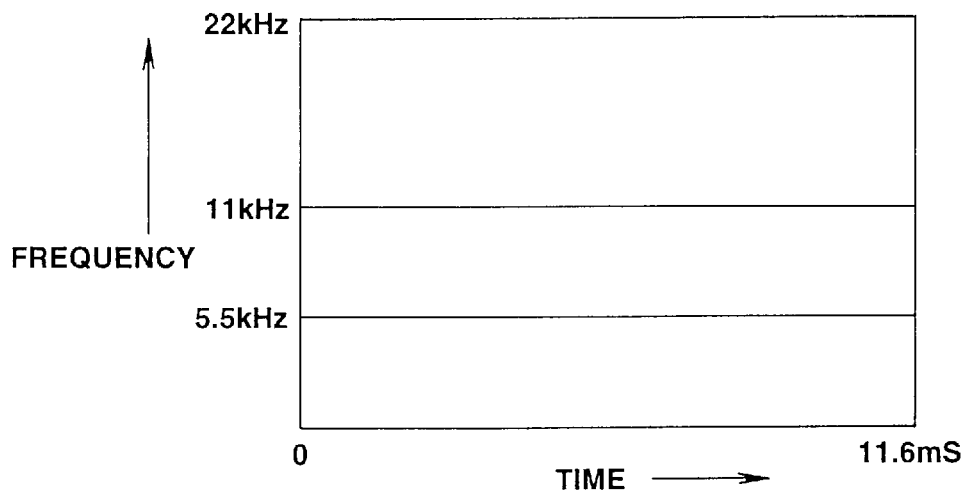
FIGS. 2A and 2B are views showing frequency division and time division of a signal in the apparatus of this embodiment.
Figure 2B:
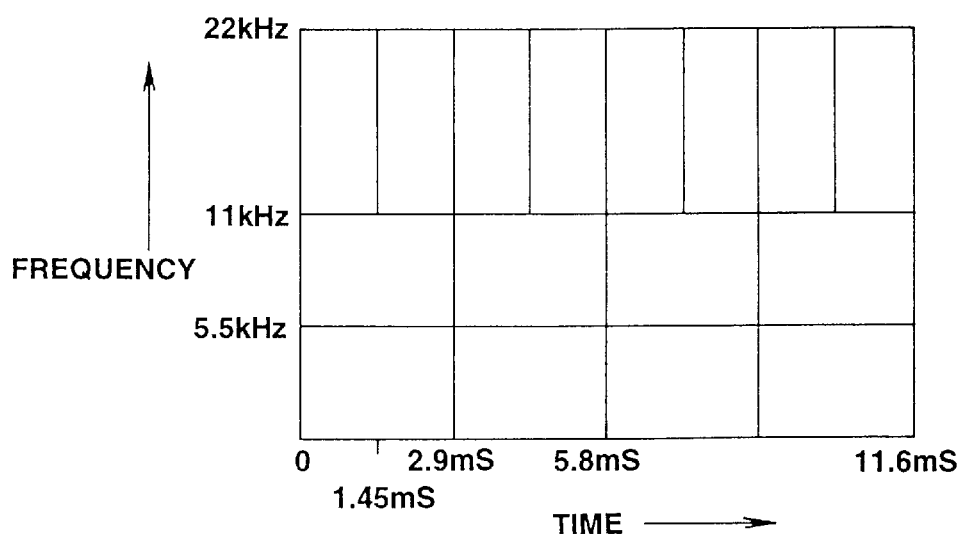

An actual example of block sizes at respective MDCT circuits 13, 14, 15 determined by the block determining circuits 19, 20, 21 are shown in FIGS. 2A and 2B. The case where the orthogonal transform block size is long (orthogonal transform block size in long mode) is shown in FIG. 2A, and the case where the orthogonal transform block size is short (orthogonal transform block size in short mode) is shown in FIG. 2B.

In the actual examples of FIGS. 2A and 2B, with respect to three filter outputs, two orthogonal transform block sizes are respectively used. Namely, with respect to the signal in the 0~5.5 kHz band of the lower frequency band side and the signal in the 5.5 k~11 kHz band of the middle band, in the case of long block length (FIG. 2A), the number of samples within one block is set to 128, and in the case where short block is selected (FIG. 2B), the number of samples within one block is set to 32. On the contrary, with respect to the signal in the 11 k~22 kHz band of the higher frequency band side, in the case of long block length (A of FIG. 2), the number of samples within one block is set to 256, and in the case where short block is selected (B of FIG. 2), the number of samples within one block is set to 32. In the case where short block is selected in this way, the numbers of samples of orthogonal transform blocks of respective bands are caused to be the same to allow the time resolution to be high (or increased) according as frequency shifts to higher frequency band side, and to decrease the kind of windows used for blocking.

In this example, information indicating the block sizes determined at the block determining circuits 19, 20, 21 are sent to adaptive bit allocation encoding circuits 16, 17, 18 which will be described later, and are outputted from output terminals 23, 25, 27.

In FIG. 1, for a second time, spectrum data or MDCT coefficient data in the frequency region obtained after undergoing MDCT processing at respective MDCT circuits 13, 14, 15 are combined every so called critical bands or every bands obtained by further dividing the critical bands in higher frequency bands, and those data thus combined are sent to adaptive bit allocation encoding circuits 16, 17, 18.

The adaptive bit allocation encoding circuits 16, 17, 18 requantize (normalize and quantize) respective spectrum data (or MDCT coefficient data) in dependency upon information of the block sizes and the numbers of bits allocated every critical bands or every bands obtained by further dividing the critical bands in higher frequency bands.

The data encoded by these respective adaptive bit allocation encoding circuits 16, 17, 18 are outputted through output terminals 22, 24, 26. Moreover, these adaptive bit allocation encoding circuits 16, 17, 18 also determine scale factors indicating magnitudes of signals in which normalization has been carried out and bit length information indicating bit length in which quantization has been carried out. These information are also outputted from output terminals 22, 24, 26 at the same time.

Moreover, from outputs of respective MDCT circuits 13, 14, 15 in FIG. 1, energies for every critical band mentioned above or every band obtained by further dividing the critical bands in higher frequency bands are determined by a method of calculating, e.g., square root of mean square of respective amplitude values within corresponding bands, or the like. As a matter of course, scale factors themselves as described above may be used for bit allocation subsequent thereto. In this case, since operation of a new energy calculation becomes unnecessary, there results economized hard scale. In addition, peak values or mean values of amplitude values, etc. may be used in place of energies every respective bands.

Figure 3:
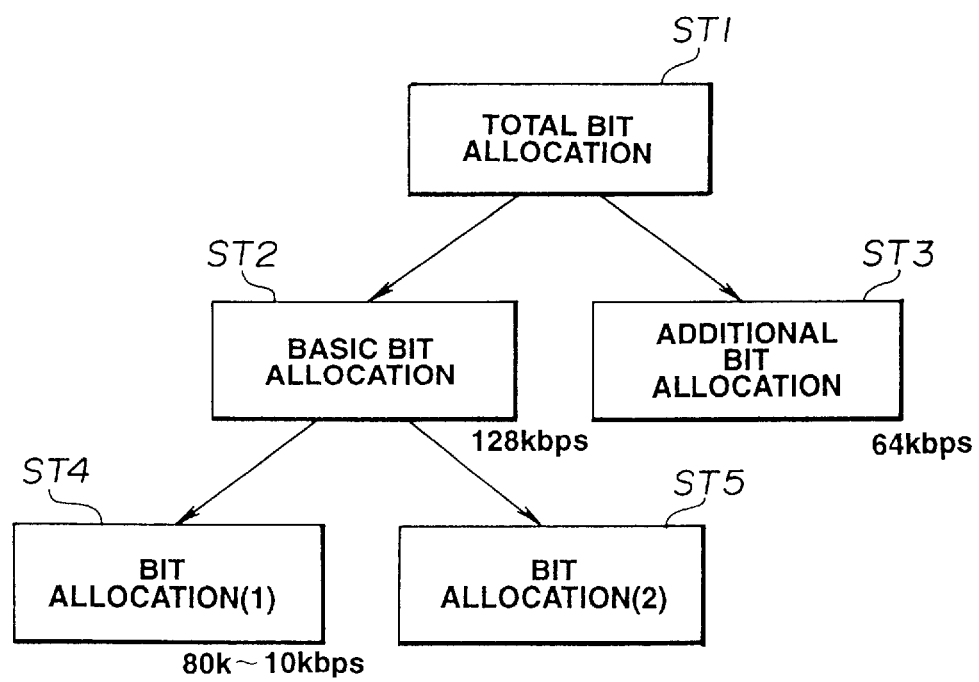
FIG. 3 is a view showing bit allocation strategy of this embodiment.

A method of an actual bit allocation at the adaptive bit allocation encoding circuits 13, 14, 15 for carrying out the bit allocation will now be described with reference to the bit allocation strategy shown in FIG. 3.

In this embodiment, from total bit allocation of step ST1, basic bit allocation of 128 kbps per channel (step ST2) is first determined, and additional bit allocation of 64 kbps (step ST3) is then determined.

The basic bit allocation among these bit allocations is used under the state where it is further divided into bit allocation (1) (step ST4) and bit allocation (2) (step ST5).

Initially, a technique for obtaining the basic bit allocation from step ST1 to step ST2 will be described.

Considering now the distribution in the frequency region of scale factors, bit allocation is adaptively carried out.

Figure 4:
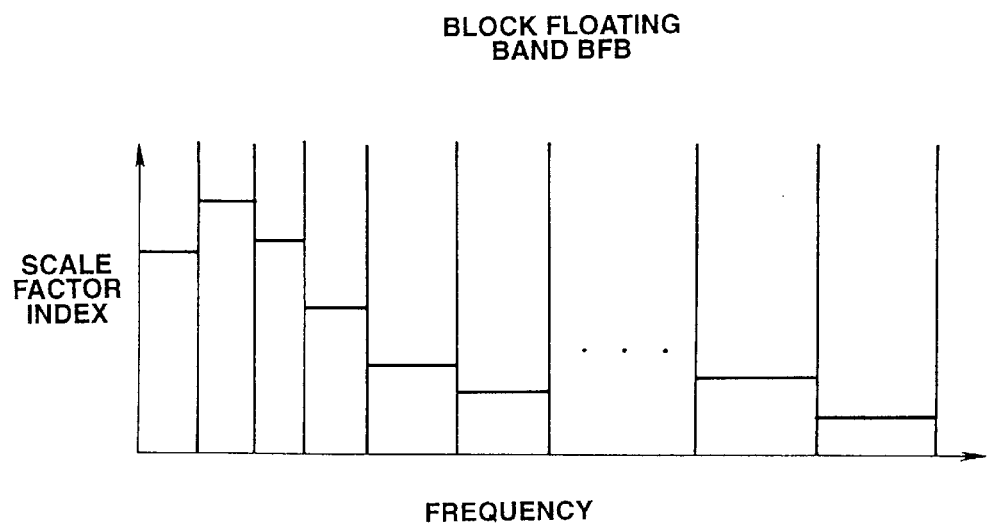
FIG. 4 is a view for explaining a method of calculating tonality from scale factors.

First, bit quantity to be used for the bit allocation (1) is decided. For this purpose, tonality information of spectrum information of signal information is used. As index of tonality here, value obtained by dividing sum of absolute values of differences between adjacent values of signal spectrum components by the number of signal spectrum components is used. It should be noted that, as a simpler index, there may employed mean values of differences between adjacent scale factor indices in scale factors for every block for so called block floating as shown in FIG. 4. This scale factor index substantially corresponds to logarithmic value of scale factor.

In the embodiment, a setting is made such that bit quantity to be used for the bit allocation (1) is 80 kbps at the maximum and 10 kbps at the minimum in a manner caused to correspond to value indicating the tonality.

The tonality calculation is carried out in a manner indicated by the following formula.

$$T = (1/(WL\max*(N-1)))(\Sigma ABS(SFn-SFn-1)$$

Figure 5:
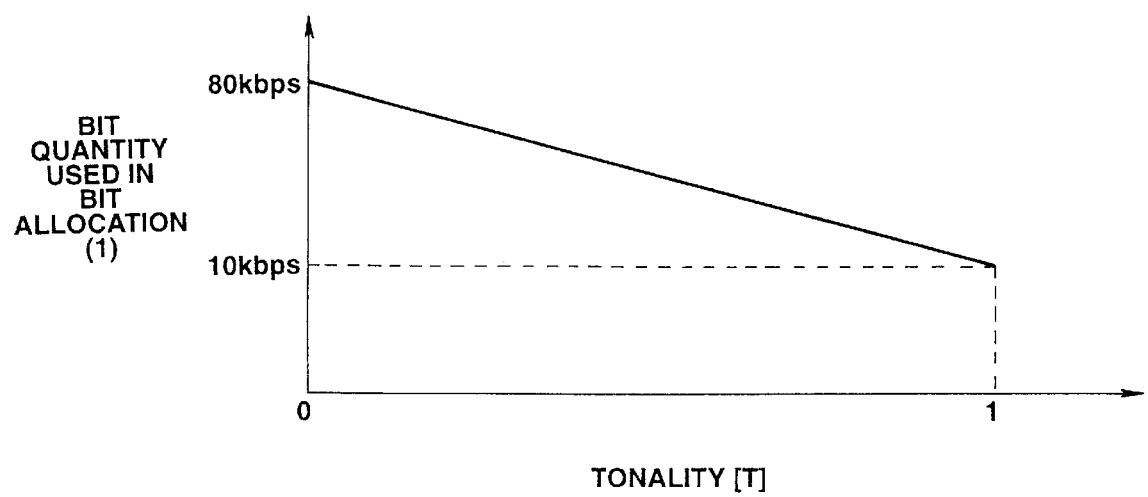
FIG. 5 is a view for explaining a method of determining bit allocation quantity of bit allocation (1) from tonality.

WLmax: Word Length maximum value=16
SFn: scale factor index, which substantially corresponds to logarithm of peak value.
n: block floating band number
N: No. of block floating bands The tonality index T and the allocation quantity of the bit allocation (1) determined in this way are caused to correspond to each other as shown in FIG. 5.

With respect to the bit allocation (1) mentioned here, allocations in the frequency and time regions dependent upon scale factors are carried out.

When bit quantity used for the bit allocation (1) is determined in this way, the processing operation shifts to allocation with respect to bits which were not used in the bit allocation (1), i.e., bit allocation (2).

Here, various kinds of bit allocations are carried out. Two examples are shown below.

Figure 6:
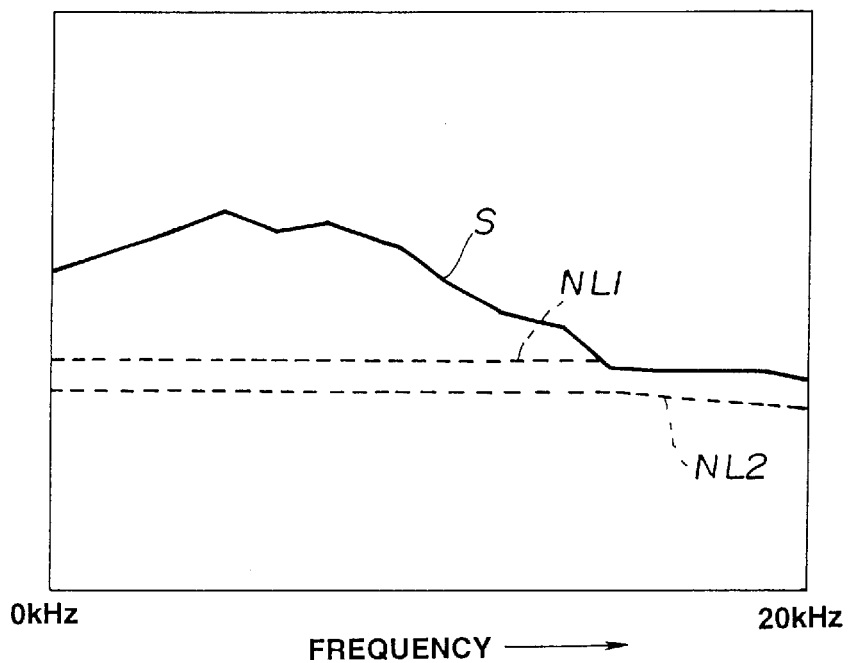
FIG. 6 is a view showing noise spectrum at the time of uniform allocation in bit allocation (2).

First, uniform allocation with respect to all sample values is carried out. Quantizing (quantization) noise spectrum with respect to bit allocation in this case (noise spectrum of uniform allocation of bit allocation (2)) is shown in FIG. 6. In accordance with this spectrum, uniform noise level reduction is carried out over the entire frequency band.

Figure 7:
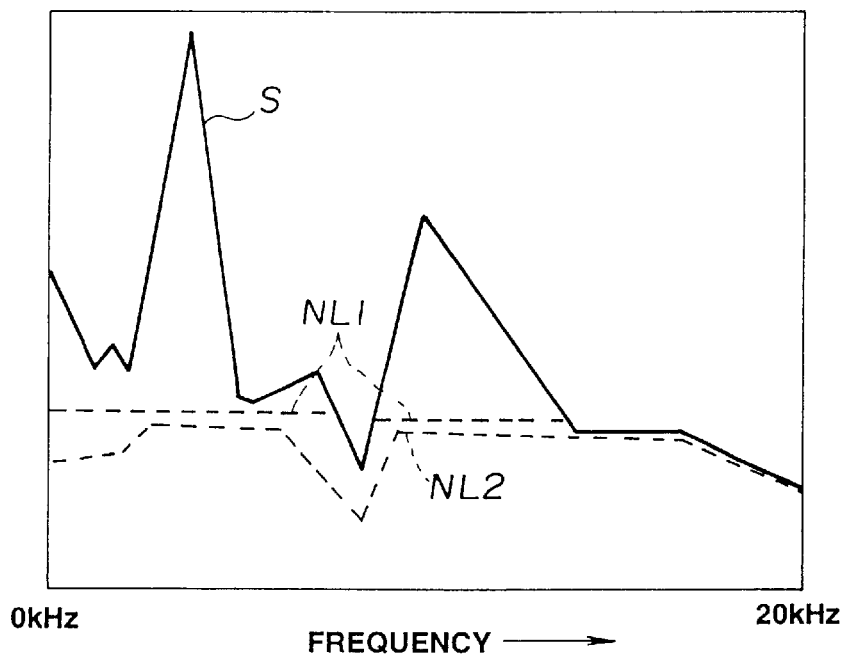
FIG. 7 is a view showing an example of noise spectrum by bit allocation in order to obtain the auditory sense effect caused to have dependency with respect to frequency spectrum and level of an information signal in the bit allocation (2).

Secondly, bit allocation for obtaining the hearing sense effect which depends upon frequency spectrum and level of signal information is carried out. An example of quantizing (quantization) noise spectrum with respect to the bit allocation in this case (noise spectrum by bit allocation for obtaining the hearing sense effect caused to have dependency with respect to frequency spectrum and level of signal information) is shown in FIG. 7. In this example, bit allocation caused to be dependent upon spectrum of an information signal is carried out, and bit allocation particularly weighted to the lower frequency band side of spectrum of an information signal is carried out so that reduction of the masking effect on the lower frequency band side occurring to a greater degree as compared to the higher frequency band side is compensated. This is based on asymmetric property of the masking curve in which importance is attached to the lower frequency band side of spectrum by taking masking between adjacent critical bands into consideration.

Figure 8:
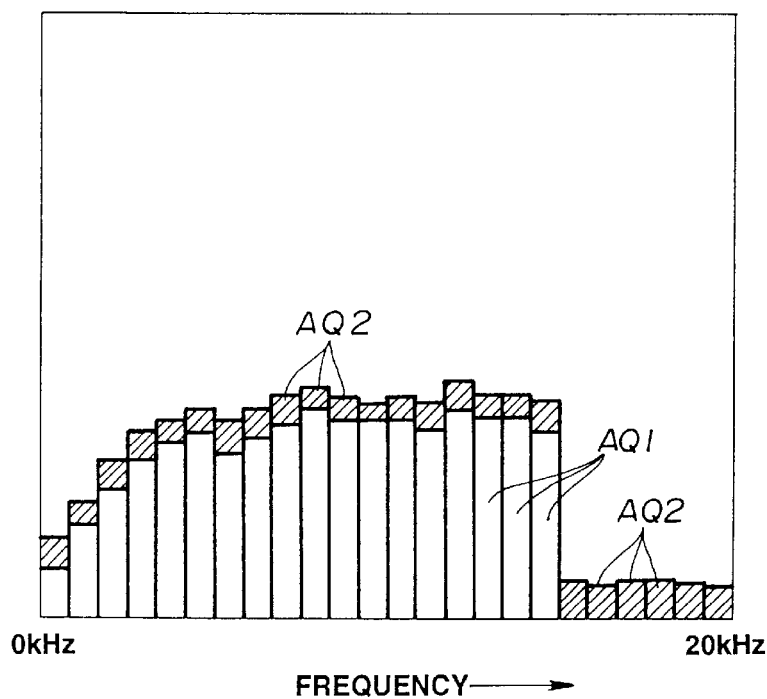
FIG. 8 is a view showing uniform allocation in the bit allocation (2).
Figure 9:
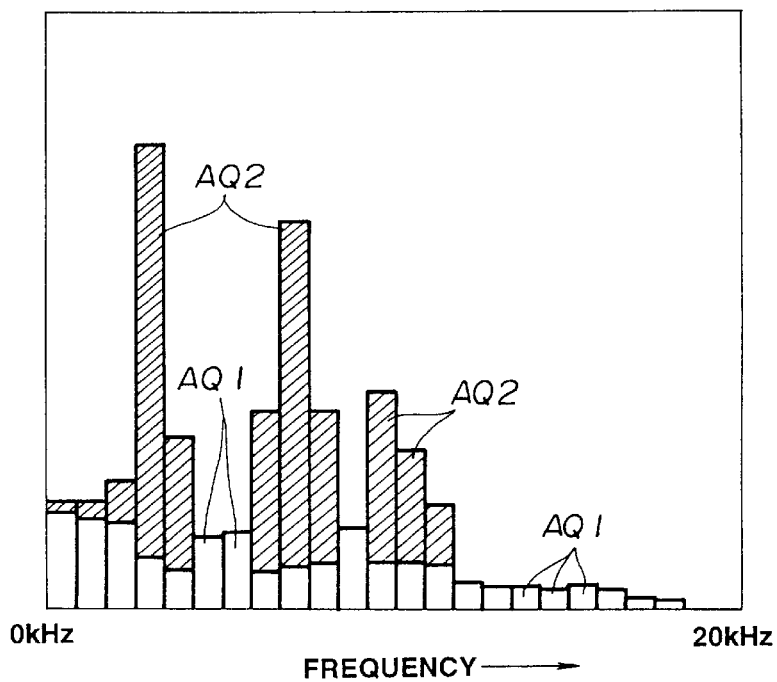
FIG. 9 is a view showing a bit allocation technique using bit allocation for obtaining the auditory sense effect caused to have dependency with respect to frequency spectrum and level of an information signal in the bit allocation (2).

FIG. 8 is a view showing bit allocation (allocation) at the time of uniform allocation of the bit allocation (2), and indicates bit allocation corresponding to FIG. 6. FIG. 9 is a view showing bit allocation for obtaining hearing sense effect which depends upon frequency spectrum and level of signal information, and indicates bit allocation corresponding to FIG. 7. Moreover, S in the figures of FIGS. 6, 7 indicates signal spectrum, NL1 indicates noise level by the bit allocation (1), and NL2 indicates noise level by the bit allocation (2). AQ1 in the figures of FIGS. 8, 9 indicates bit quantity of the bit allocation (1) and AQ2 in the figure indicates bit quantity of the bit allocation (2).

Another technique of the basic bit allocation will now be described.

Figure 10:
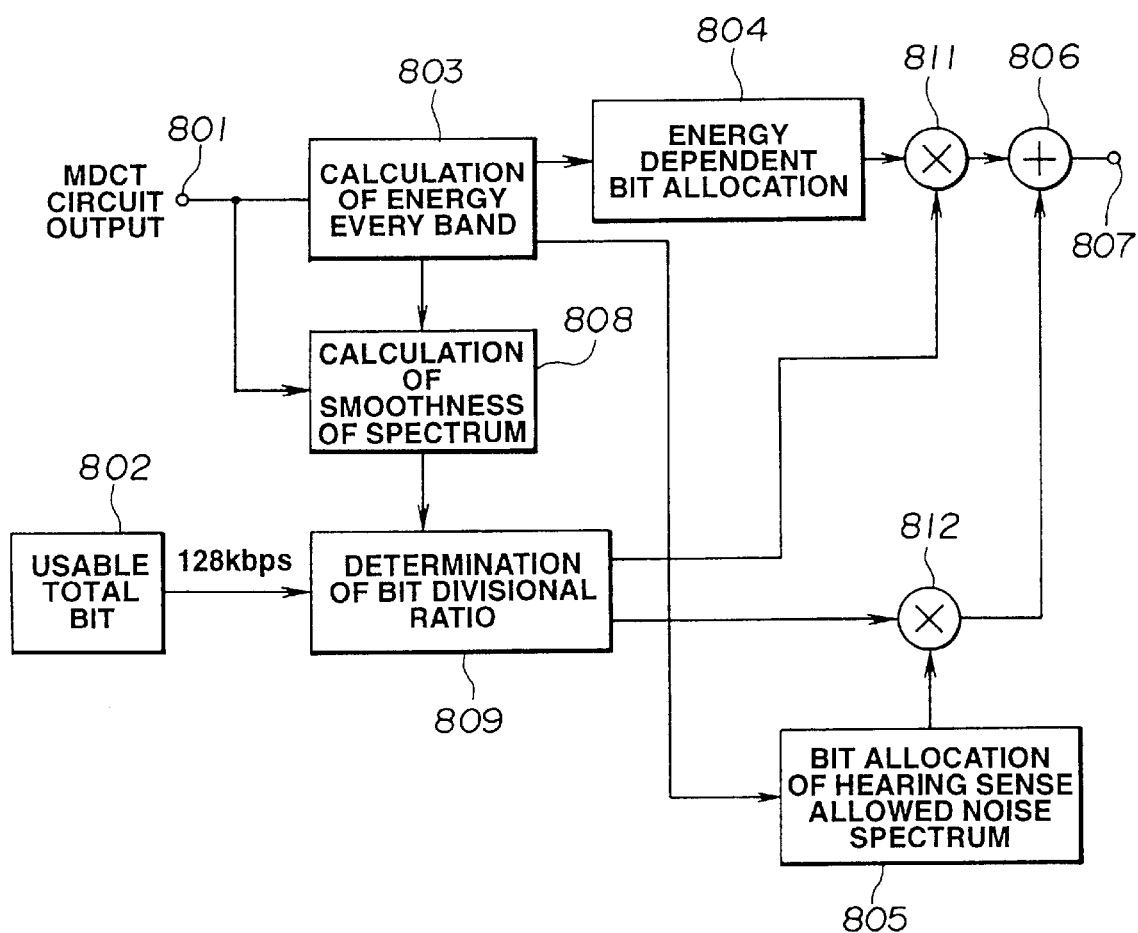
FIG. 10 is a block circuit diagram showing an example of the configuration of basic bit allocation function of the embodiment of this invention.

The operation of the adaptive bit allocation circuit in this case will be described below with reference to FIG. 10. Magnitudes of MDCT coefficients are determined every respective blocks. These MDCT coefficients thus determined are delivered to input terminal 801. The MDCT coefficient delivered to the input terminal 801 is delivered to a circuit 803 for calculating energy every band. The circuit 803 for calculating energy every band calculates signal energies relating to critical bands or respective bands obtained by further re-dividing the critical bands in higher frequency bands. The energies relating to respective bands calculated at the circuit 803 for calculating energy every band are delivered to an energy dependent bit allocation circuit 804.

The energy dependent bit allocation circuit 804 carries out such a bit allocation to create (generate) white quantizing noises by using usable total bit quantity from a usable total bit generating circuit 802, a certain ratio (percentage) of 128 kbps in this embodiment. At this time, according as tonality of an input signal becomes higher, i.e., unevenness of spectrum of the input signal becomes greater, and the ratio occupied in the 128 kbps of the bit quantity increases to a greater degree. In this case, for the purpose of detecting unevenness of spectrum of the input signal, sum of absolute values of differences between block floating coefficients of adjacent blocks is used as index. Then, with respect to the determined usable bit quantity, bit allocation proportional to logarithmic values of energies of respective bands is carried out.

A hearing sense allowed noise level dependent bit allocation calculating circuit 805 first determines, on the basis of spectrum data divided every critical bands, allowed noise quantities every respective critical bands in which so called masking effect, etc. is taken into consideration. Then, bits (bit quantity) obtained by subtracting energy dependent bit quantity from usable total bit quantity are allocated in order to provide a hearing sense allowed noise spectrum. The energy dependent bit quantity and the hearing sense allowed noise level dependent bit quantity determined in this way are added. Thus, respective spectrum data (or MDCT coefficient data) are re-quantized in dependency upon the numbers of bits allocated every respective critical bands or every plural bands obtained by further dividing the critical bands in higher frequency bands by the adaptive bit allocation encoding circuits 16, 17, 18 of FIG. 1. Data encoded in this way are taken out through output terminals 22, 24, 26 of FIG. 1.

The hearing sense allowed noise spectrum calculating circuit in the hearing sense allowed noise spectrum dependent bit allocation calculating circuit 805 will now be described in more detail. MDCT coefficients obtained at the MDCT circuits 13, 14, 15 are delivered to the allowed noise spectrum calculating circuit in the bit allocation calculating circuit 805.

Figure 11:
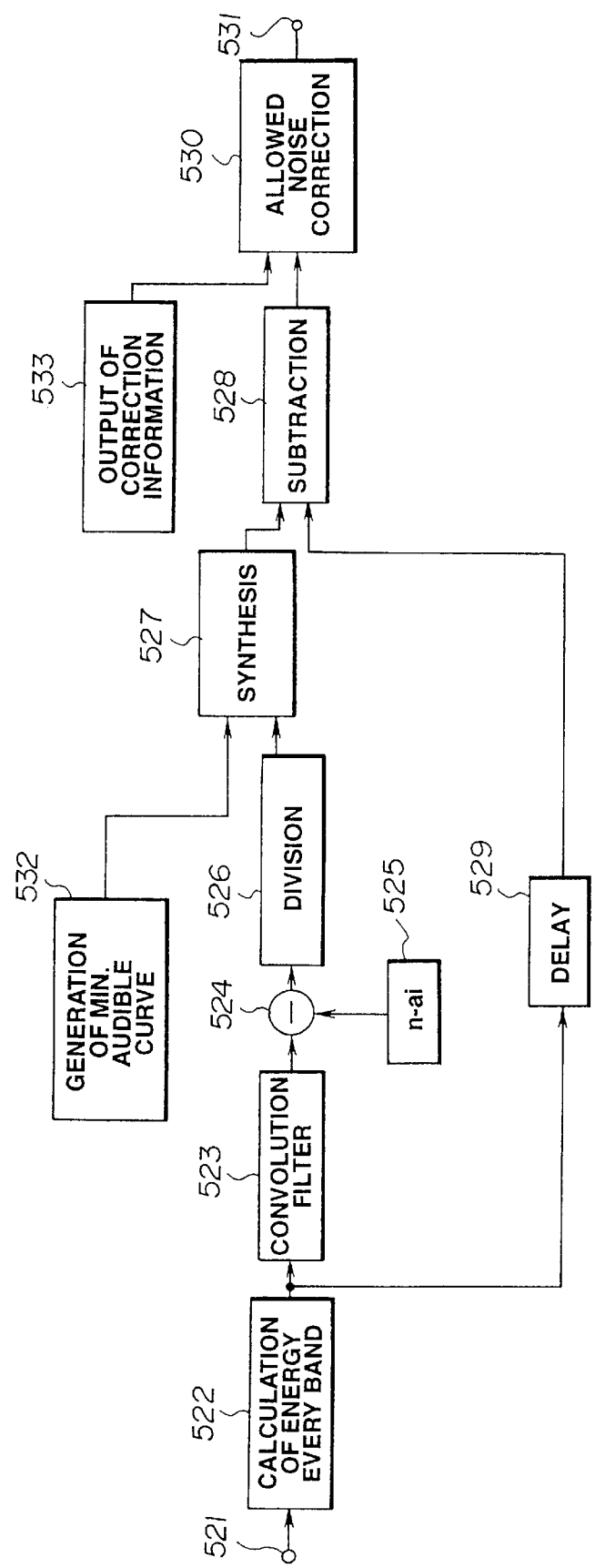
FIG. 11 is a block circuit diagram showing an example of the configuration of hearing sense masking threshold calculating function of the embodiment of this invention.

FIG. 11 is a view for collectively explaining the allowed noise spectrum calculating circuit, and is a block circuit diagram showing outline of an actual configuration of the allowed noise spectrum calculating circuit. In the FIG. 11 mentioned above, input terminal 521 is supplied with spectrum data of the frequency region from the MDCT circuits 13, 14, 15.

Figure 12:
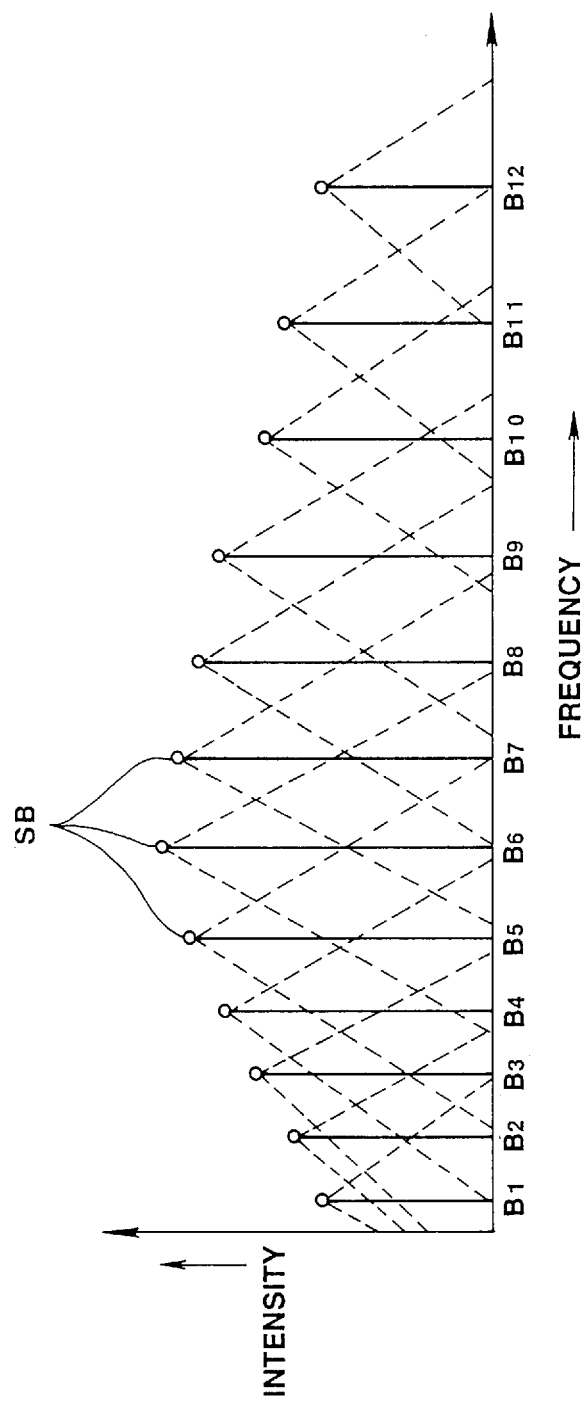
FIG. 12 is a view showing masking by respective critical band signals.

The input data of the frequency region is sent to a circuit 522 for calculating energy for every band, at which energies every critical bands are determined by, e.g., a method of calculating sum total of respective amplitude value squares within corresponding bands, or the like. In place of energies for every respective bands, there are instances where peak values or mean values, etc. of amplitude values are used. Spectrum of, e.g., sum total value of respective bands as an output of the energy calculating circuit 522 is generally called bark spectrum. FIG. 12 shows bark spectrum SB every respective critical bands as stated above. In FIG. 12, for the brevity of illustration, the number of bands of the critical bands is represented by 12 (B1~B12).

Here, in order to allow for the influence in so called masking of the bark spectrum SB, such a convolution processing to multiply respective values of the bark spectrum SB by a predetermined weighting function to add multiplied values is implemented. To realize this, outputs of the circuit 522 for calculating energy every band, i.e., respective values of the bark spectrum SB are sent to a convolution filter circuit 523. The convolution filter circuit 523 is composed of, e.g., a plurality of delay elements for sequentially delaying input data, a plurality of multipliers (e.g., 25 multipliers corresponding to respective bands) for multiplying outputs of these delay elements by filter coefficients (weighting function), and a sum total adder for taking sum total of outputs of respective multipliers.

It should be noted that the above-mentioned masking refers to the phenomenon that a signal is masked by another signal by the characteristic from a viewpoint of hearing sense of the human being so that the signal cannot be heard. For such masking effect, there are time axis masking effect by an audio signal in the time region and simultaneous masking effect by a signal in the frequency region. By these masking effects, even if any noise exists at a portion to be masked, such noise would not be heard. For this reason, in actual audio signals, noises within the range subjected to masking are caused to be allowable noise.

Moreover, an actual example of multiplication coefficients (filter coefficients) of respective multipliers of the convolution filter circuit 523 is shown. Assuming that coefficient of multiplier M corresponding to an arbitrary band is 1, respective coefficients of multipliers M−1, M−2, M−3, M+1, M+2, M+3 are respectively 0.15, 0.0019, 0.0000086, 0.4, 0.06, 0.007. At this convolution filter circuit 523, outputs of respective delay elements are respectively multiplied by coefficient 0.15 at multiplier M−1, coefficient 0.0019 at multiplier M−2, coefficient 0.0000086 at multiplier M−3, coefficient 0.4 at multiplier M+1, coefficient 0.06 at multiplier M+2, and coefficient 0.007 at multiplier M+3. Thus, convolution processing of the bark spectrum SB is carried out. In this case, M is an arbitrary integer in the range of 1~25.

Then, an output of the convolution filter circuit 523 is sent to a subtracter 524. The subtracter 524 serves to determine a level a corresponding to allowable noise level which will be described later in the convoluted region. It is to be noted that the level a corresponding to the allowable noise level (allowed noise level) is such a level to become equal to allowed noise level every band of the critical bands by carrying out inverse convolution processing as described later.

Here, the allowed function for determining the above-mentioned level a (function representing masking level) is delivered to the subtracter 524. By increasing or decreasing the allowed function value, control of the level a is carried out. This allowed function is delivered from an (n-ai) function generating circuit 525 as described below.

Namely, when numbers given in order from the lower frequency band side of band of the critical bands are assumed to be i, level a corresponding to the allowed noise level can be determined (calculated) by the following formula.

$$a=S-(n-ai)$$

In the above-mentioned formula, n, a are constants (a>o), S is intensity of convolution processed bark spectrum, and (n-ai) in the formula is allowed function. As an example, n=38 and a=−0.5 may be used.

The above-mentioned level a is determined in this way, and data thereof is sent to a divider 526. This divider 526 serves to allow the level a in the convoluted region to undergo inverse convolution. Accordingly, by carrying out such inverse convolution processing, a masking threshold is obtained from the level a. Namely, this masking threshold becomes allowed noise spectrum. It is to be noted while the above-mentioned inverse convolution processing requires complicated operation, simplified divider 526 is used in this embodiment to carry out inverse convolution.

Figure 13:
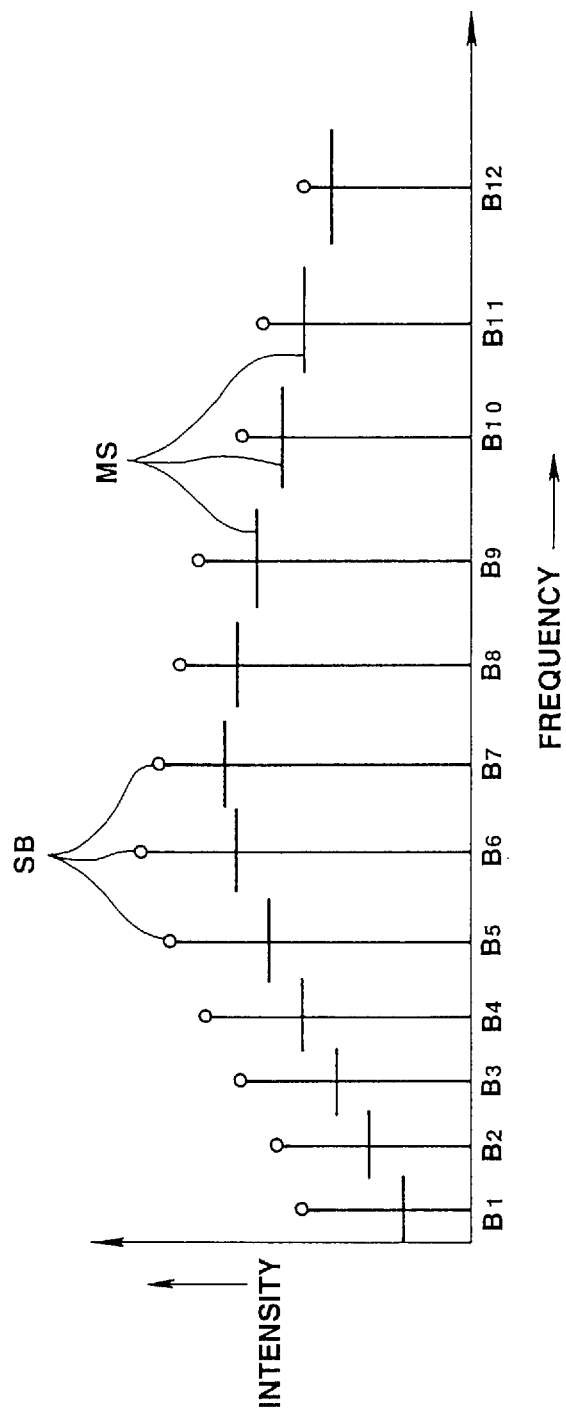
FIG. 13 is a view showing masking threshold by respective critical band signals.

Then, the above-mentioned masking threshold is sent to a subtracter 528 through a synthesis circuit 527. Here, this subtracter 528 is supplied with an output of the circuit 522 for detecting energy every band, i.e., the previously described bark spectrum SB through a delay circuit 529. Accordingly, at this subtracter 528, subtractive operation between the masking threshold and the bark spectrum SB is carried out, whereby the bark spectrum SB is caused to undergo processing such that the portion below the level indicated by the level of the masking threshold MS is masked as shown in FIG. 13. In this example, the above-mentioned delay circuit 529 is provided for delaying bark spectrum SB from the energy detecting circuit 522 by taking into consideration delay quantities at respective circuit of the synthesis circuit 527 and stages preceding thereto.

An output of the subtracter 528 is taken out through an allowed noise correcting circuit 530 and through output terminal 531, and is sent to ROM, etc. (not shown) in which, e.g., allocation bit number information are stored in advance. This ROM, etc. outputs allocation bit number information every respective bands in dependency upon an output obtained through the allowed noise correcting circuit 530 from the subtracter 528 (level of difference between energy of each band which is an output of the delay element 529 and an output of the divider 526).

In this way, the energy dependent bit quantity and the hearing sense allowed noise level dependent bit quantity are added, and the allocation bit number information thereof is sent to the adaptive bit allocation encoding circuits 16, 17, 18. Thus, respective spectrum data of the frequency region from MDCT circuits 13, 14, 15 are quantized by the numbers of bits allocated every respective bands.

Namely, in short, the adaptive bit allocation encoding circuits 16, 17, 18 quantize the spectrum data for every respective band by the numbers of bits allocated in dependency upon levels of differences between energies or peak values for every respective band of the critical bands (every critical bands), or every plural bands obtained by further dividing the critical bands in higher frequency bands, and an output of the divider 526.

Figure 14:
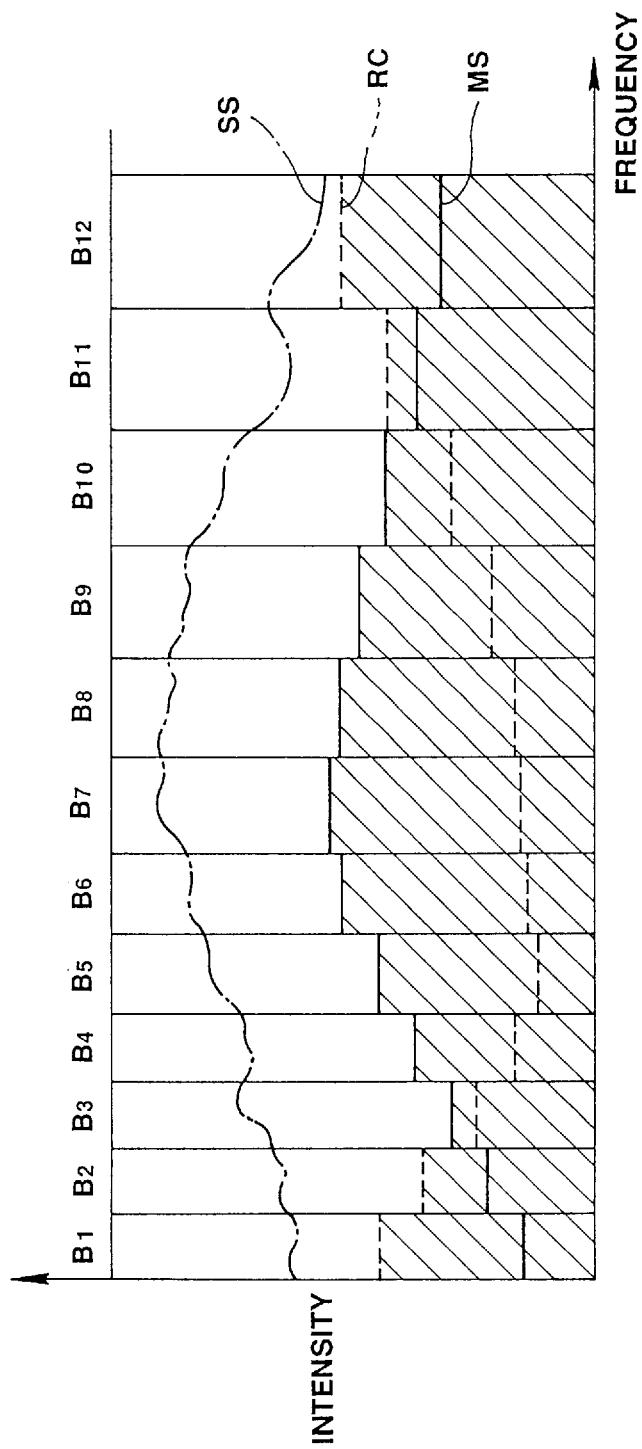
FIG. 14 is a view showing information spectrum, masking threshold and minimum audible limit.

Meanwhile, the above-described synthesis circuit 527 can synthesize data indicating so called minimum audible curve RC which is the hearing sense characteristic of the human being as shown in FIG. 14 delivered from a minimum audible curve generating circuit 532 and the above-mentioned masking threshold MS. In this minimum audible curve RC, if the noise absolute level is less than the minimum audible curve RC, such noise would not be heard. This minimum audible curve RC varies by, e.g., difference of reproduction volume at the time of reproduction even if coding is the same. However, in realistic digital systems, since there is no difference in the way of entering of music into, e.g., 16 bit dynamic range, if it is assumed that quantizing noise in a frequency band which is most easily heard to the ear in the vicinity of, e.g., 4 kHz is not heard, it is considered that such quantizing noise less than the level of the minimum audible curve RC cannot be heard in other frequency bands. Accordingly, with a way of use such that noise in the vicinity of, e.g., 4 kHz of the dynamic range that the system has is assumed to be employed, and the minimum audible curve RC and the masking threshold MS are synthesized together so that allowed noise level is provided, the allowed noise level in this case is permitted to be up to the portion indicated by slanting lines in FIG. 14. In this embodiment, level of 4 kHz of the minimum audible curve RC is caused to be in correspondence with the minimum level corresponding to, e.g., 20 bits. In addition, FIG. 14 shows signal spectrum SS together.

Moreover, the allowed noise correcting circuit 530 corrects, on the basis of information of, e.g., equi-loudness curve sent from a correction information output circuit 533, allowed noise level in an output of the subtracter 528. Here, the equi-loudness curve is a characteristic curve relating to the hearing sense characteristic of the human being. This equi-loudness curve is obtained by determining sound pressures of sound at respective frequencies which can be heard at the same pitch (loudness) as that of a pure sound at, e.g., 1 kHz to connect them by curves, and is also called an equi-sensitivity curve of loudness. Moreover, the equi-loudness curve depicts substantially the same curve as the minimum audible curve RC shown in FIG. 14. In this equi-loudness curve, e.g., at a frequency in the vicinity of 4 kHz, even if sound pressure is lowered by 8~10 dB as compared to that at 1 kHz, sound can be heard at the same pitch (loudness) as that at 1 kHz. In contrast, at a frequency in the vicinity of 50 Hz, if sound pressure is not higher by about 15 dB than that at 1 kHz, sound cannot be heard at the same pitch (loudness). For this reason, it is seen that it is desirable to allow noise beyond level of the minimum audible curve RC (allowed noise level) to have a frequency characteristic given by the curve corresponding to the equi-loudness curve. From facts as described above, it is seen that correction of the allowed noise level by taking the equi-loudness curve into consideration is in conformity with the hearing sense characteristic of the human being.

The spectrum shape dependent upon the above-described hearing sense allowed noise level is created (prepared) by bit allocation using a certain ratio of usable total bit quantity 128 Kbps. This ratio is decreased to a greater degree according as tonality of an input signal becomes higher.

Bit quantity division technique between two bit allocation techniques will now be described.

Turning back to FIG. 10, a signal from input terminal 801 supplied with outputs of MDCT circuits 13, 14, 15 is delivered also to a spectrum smoothness calculating circuit 808, at which smoothness of spectrum is calculated. In this embodiment, a value obtained by dividing sum of absolute values of differences between adjacent values of absolute values of a signal spectrum by sum of absolute values of the signal spectrum is used as smoothness of the spectrum.

An output of the spectrum smoothness calculating circuit 808 is delivered to a bit divisional ratio determining circuit 809, at which bit divisional ratio between energy dependent bit allocation and bit allocation by the hearing sense allowed noise level is determined. In this case, bit allocation based on the bit allocation ratio is carried out below. For example, according as an output value of the spectrum smoothness calculating circuit 808 becomes greater, smoothness of spectrum is considered to be lost to more degree to carry out a bit allocation in which emphasis is laid on bit allocation by the hearing sense allowed noise spectrum rather than the energy dependent bit allocation. The bit divisional ratio determining circuit 809 sends a control output to multipliers 811 and 812 for respectively controlling magnitudes of the energy dependent bit allocation and the bit allocation by the hearing sense allowed noise spectrum. Here, when spectrum is assumed to be smooth, and an output of the bit divisional ratio determining circuit 809 to the multiplier 811 takes a value of 0.8 so as to lay emphasis on the energy dependent bit allocation, an output of the bit divisional ratio determining circuit 809 to the multiplier 812 is assumed to be 1−0.8=0.2. These outputs of two multipliers 811, 812 are added at an adder 806, resulting in final bit allocation information. This bit allocation information thus obtained is outputted from output terminal 807.

Figure 15:
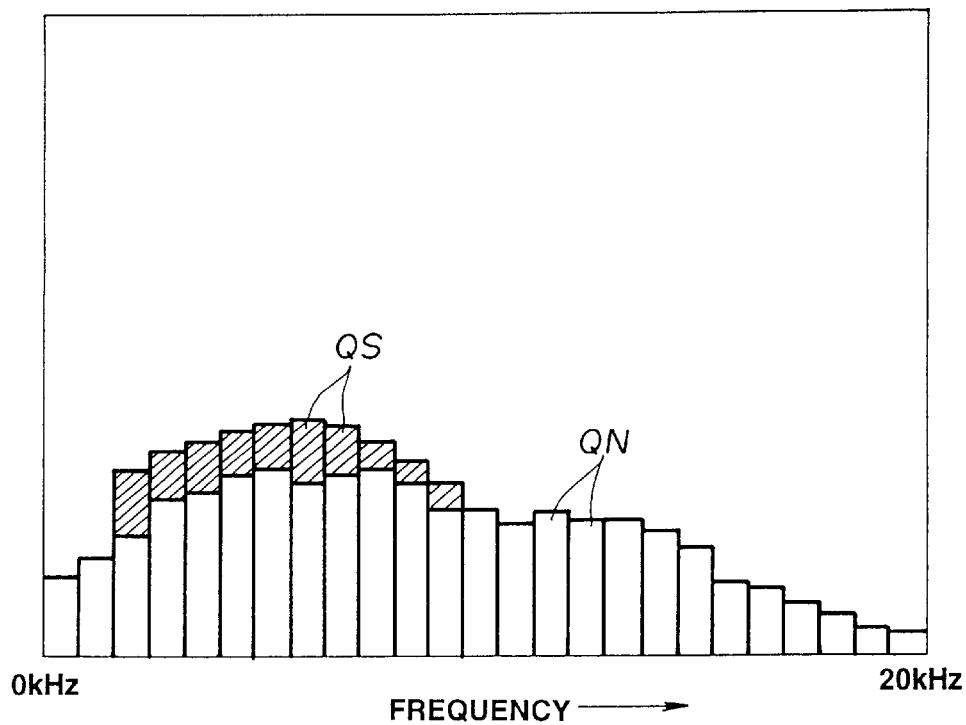
FIG. 15 is a view showing a signal level dependent bit allocation and a hearing sense allowed noise level dependent bit allocation with respect to an information signal in which signal spectrum is flat.
Figure 16:
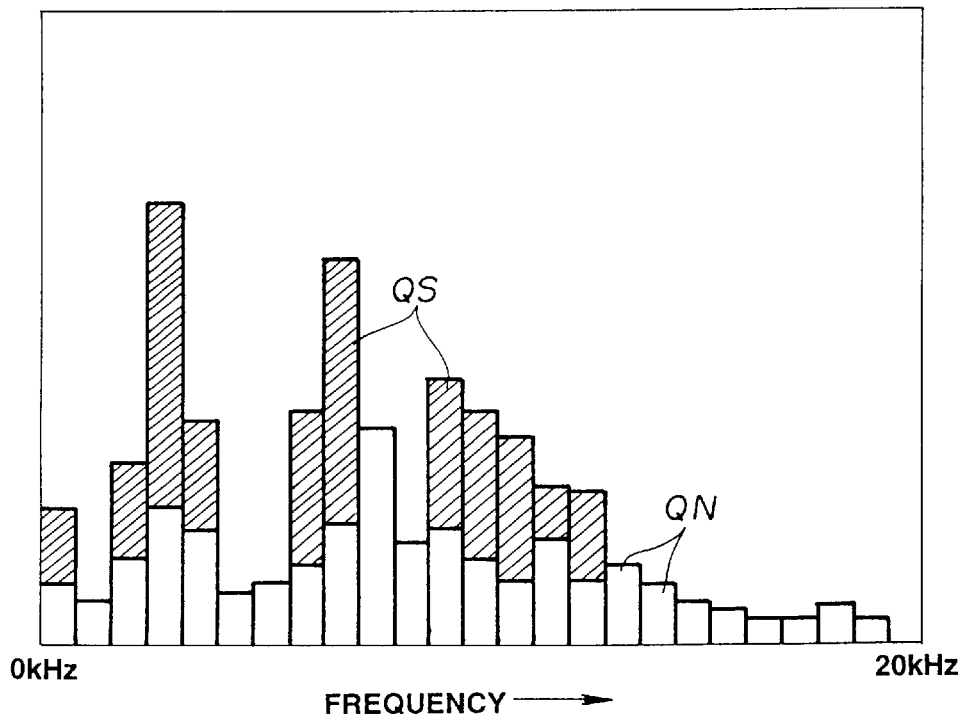
FIG. 16 is a view showing a signal level dependent bit allocation and a hearing sense allowed noise level dependent bit allocation with respect to an information signal in which tonality of signal spectrum is high.
Figure 17:
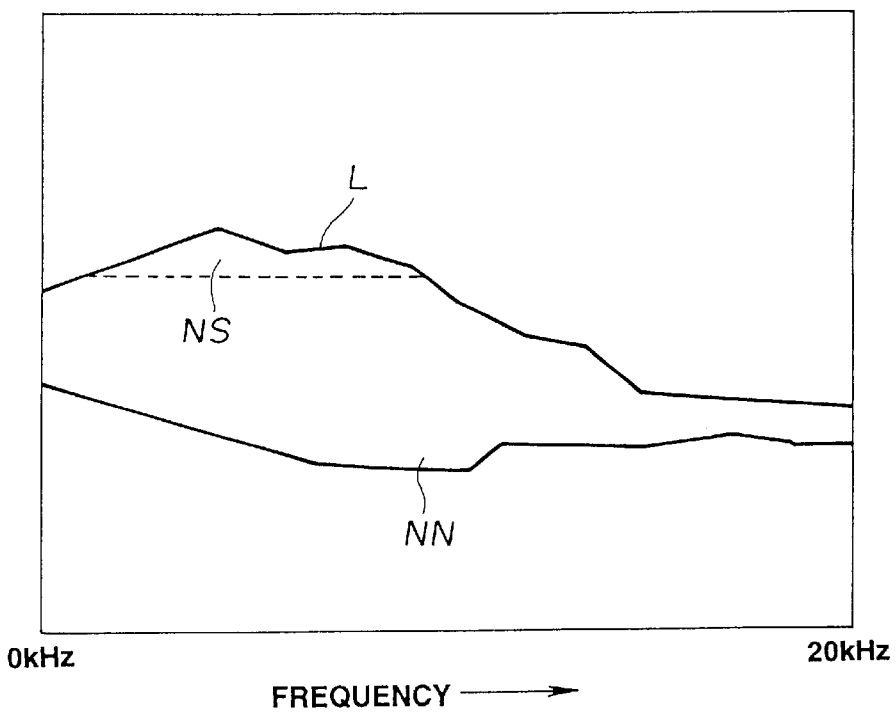
FIG. 17 is a view showing quantizing (quantization) noise level with respect to an information signal in which signal spectrum is flat.
Figure 18:
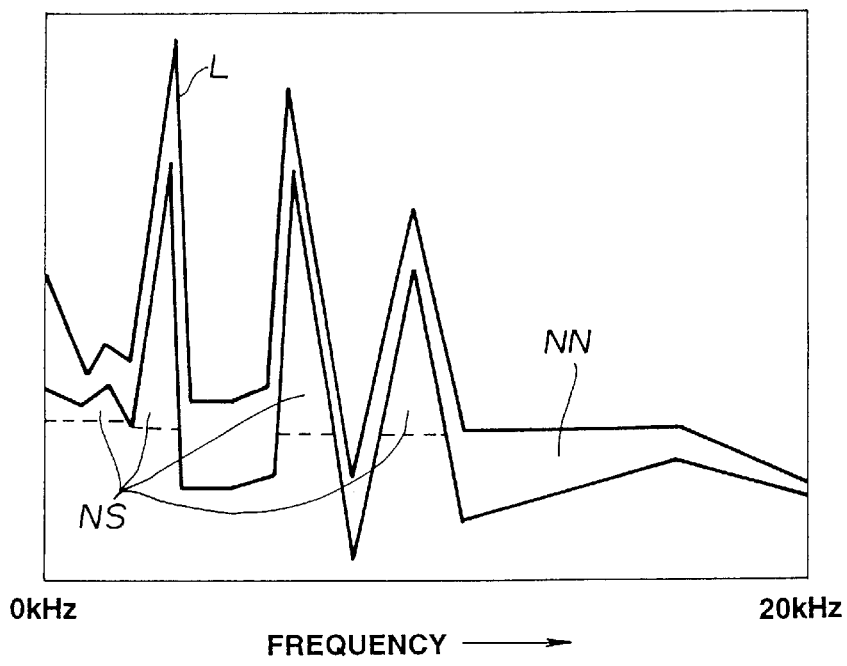
FIG. 18 is a view showing quantizing (quantization) noise level with respect to an information signal in which tonality is high.

The state of the bit allocation at this time is shown in FIGS. 15 and 16. Moreover, the state of quantizing noises corresponding thereto is shown in FIGS. 17 and 18. FIG. 15 shows the case where spectrum of a signal is relatively flat and FIG. 16 shows the case where signal spectrum indicates high tonality. Further, QS in the figures of FIGS. 15 and 16 indicates signal level dependent bit quantity and QN in the figures indicates bit quantity of hearing sense allowed noise level dependent bit allocation. L in the figures of FIGS. 17 and 18 indicates signal level, NS in the figure indicates degree of lowering of noise by signal level dependent bit allocation, and NN in the figures indicates degree of lowering of noise by the hearing sense allowed noise level dependent bit allocation.

Initially, in FIG. 15 showing the case where spectrum of a signal is relatively flat, hearing sense allowed noise level dependent bit allocation is useful for taking a large signal-to-noise ratio over the entire frequency band. However, in lower and higher frequency bands, bit allocation of relatively lesser number of bits is used. This is because sensitivity with respect to noises in these bands is low. While the number of bits by bit allocation dependent upon signal energy level is small from a quantitative point of view, bits are allocated, in this case, preponderantly in the frequency region where signal levels of medium and lower bands are high so as to produce noise spectrum in a manner of white.

On the contrary, as shown in FIG. 16, in the case where signal spectrum indicates high tonality, the ratio of bit allocation dependent upon signal energy level becomes higher, and lowering of quantizing noises is used (effective) for reducing noises in extremely narrow bands. Concentration of bit allocation dependent upon the hearing sense allowed noise level is not so severe than that (bit allocation dependent upon signal energy level).

As shown in FIG. 16, by sum of the both bit allocations, improvement in the characteristic at an isolated spectrum input signal is attained.

The above-mentioned additional bit allocation (step ST3) portion is added, in a manner described below, to the basic bit allocation obtained in a manner stated above.

Separation between the basic bit allocation and the additional bit allocation portion and connection therebetween at the time of reproduction will now be described with reference to FIG. 19.

Figure 19:
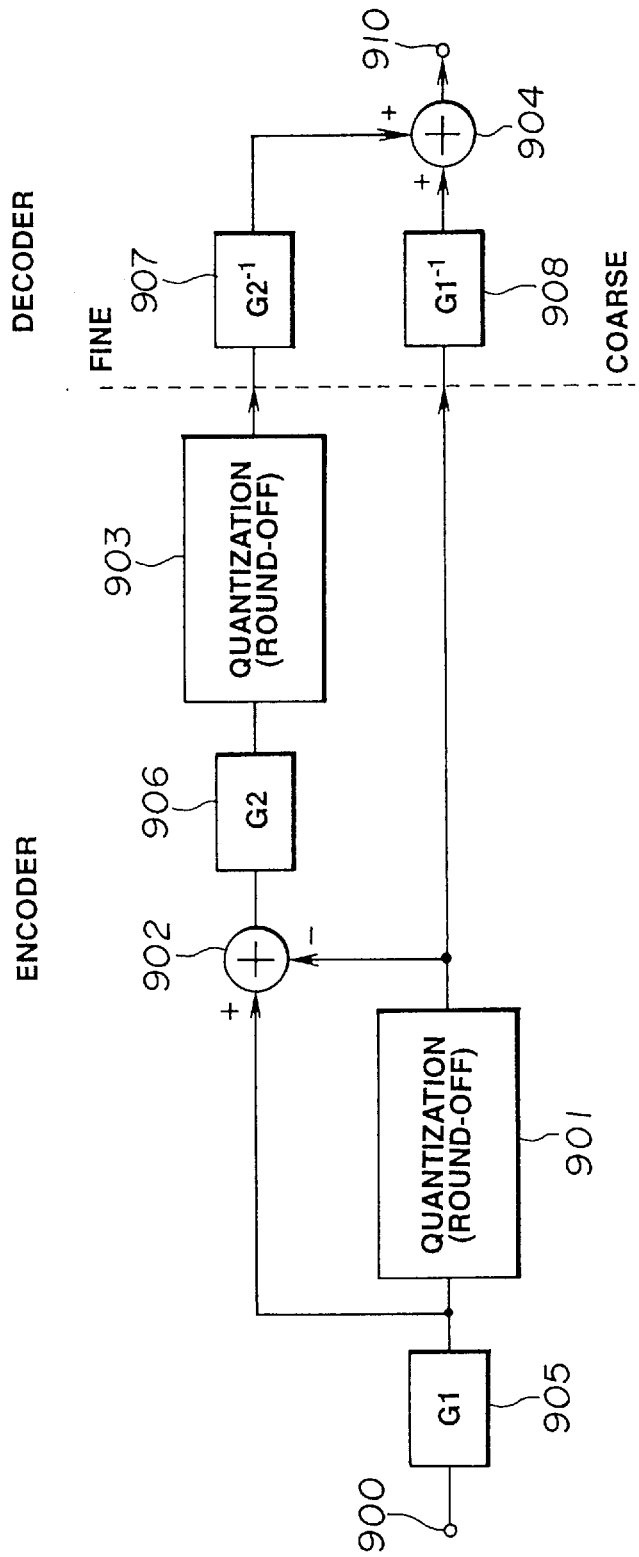
FIG. 19 is a block circuit diagram showing an actual configuration for carrying out division between basic bit allocation and additional bit allocation.

Initially, MDCT coefficients which are outputs of the MDCT circuits 13, 14, 15 of FIG. 1 are assumed to be delivered to input terminal 900 of the configuration of FIG. 19. Namely, the encoder side of FIG. 19 is included in the adaptive bit allocation encoding circuits 16, 17, 18 of FIG. 1.

In FIG. 19, MDCT coefficients (MDCT samples) delivered to the input terminal 900 are caused to undergo, for every plural samples, normalization processing with respect to blocks, i.e., block floating by a normalizing circuit 905. At this time, scale factors are obtained as coefficients indicating to what degree block floating has been carried out.

A quantizer 901 of the succeeding stage carries out quantization by respective sample word lengths (word lengths) given by the basic bit allocation. At this time, quantization by round-off is carried out in order to reduce quantizing noises.

Then, an output of the normalizing circuit 905 and an output of the quantizer 901 are sent to a difference element 902. Namely, at the difference element 902, a difference (quantizing error) between input and output of the quantizer 901 is taken. An output of the difference element 902 is further sent to a second quantizer 903 through a normalizing circuit 906.

At the second quantizer 903, e.g., 2 bits are used every respective samples. Scale factor at the normalizing circuit 906 is automatically determined from scale factor and word length used at the first quantizer 901.

Namely, at the encoder side of the configuration of FIG. 19, when word length which was used at the first quantizer 901 is, e.g., N bits, scale factor used at the normalizing circuit 906 is obtained by $(2^{**}N)$.

Moreover, the second quantizer 903 for the additional bit allocation carries out bit allocation including round-off processing in the same manner as in the first quantizer 901 for the basic bit allocation. In this way, by two quantization (elements), bit allocation is divided into two bit allocations.

Even in the case where word length for the additional bit allocation is not fixed, since, with respect to magnitude of component of the additional bit allocation, scale factor of the additional bit allocation can be calculated from scale factor and word length of the basic bit allocation as previously described, only word length is required in the decoder. In this embodiment, since word length of the additional bit allocation is fixed to 2 bits, even word length for the additional allocation is not required. In this way, high efficiency quantization in which outputs of the quantizers 901 and 903 are respectively rounded off are realized.

It is to be noted that if output bit rates of the quantizers 901 and 903 are both fixed, the system can be simplified at the time of carrying out recording onto media such as disc or tape, etc. Moreover, there may be employed a configuration in which total output bit rate of the both quantizers is caused to be fixed while allowing individual output bit rates to be variable. As a matter of course, only output bit rate of a portion of quantizers may be fixed.

In the configuration (decoder) corresponding to the configuration (encoder) of FIG. 19, inverse normalizing circuits 908, 907 for carrying out inverse normalization processing corresponding to the normalizing circuits 905, 906 are provided, and outputs of the inverse normalizing circuits 908, 907 are added at an adder 904. Its added output is taken out from output terminal 910.

Figure 20:
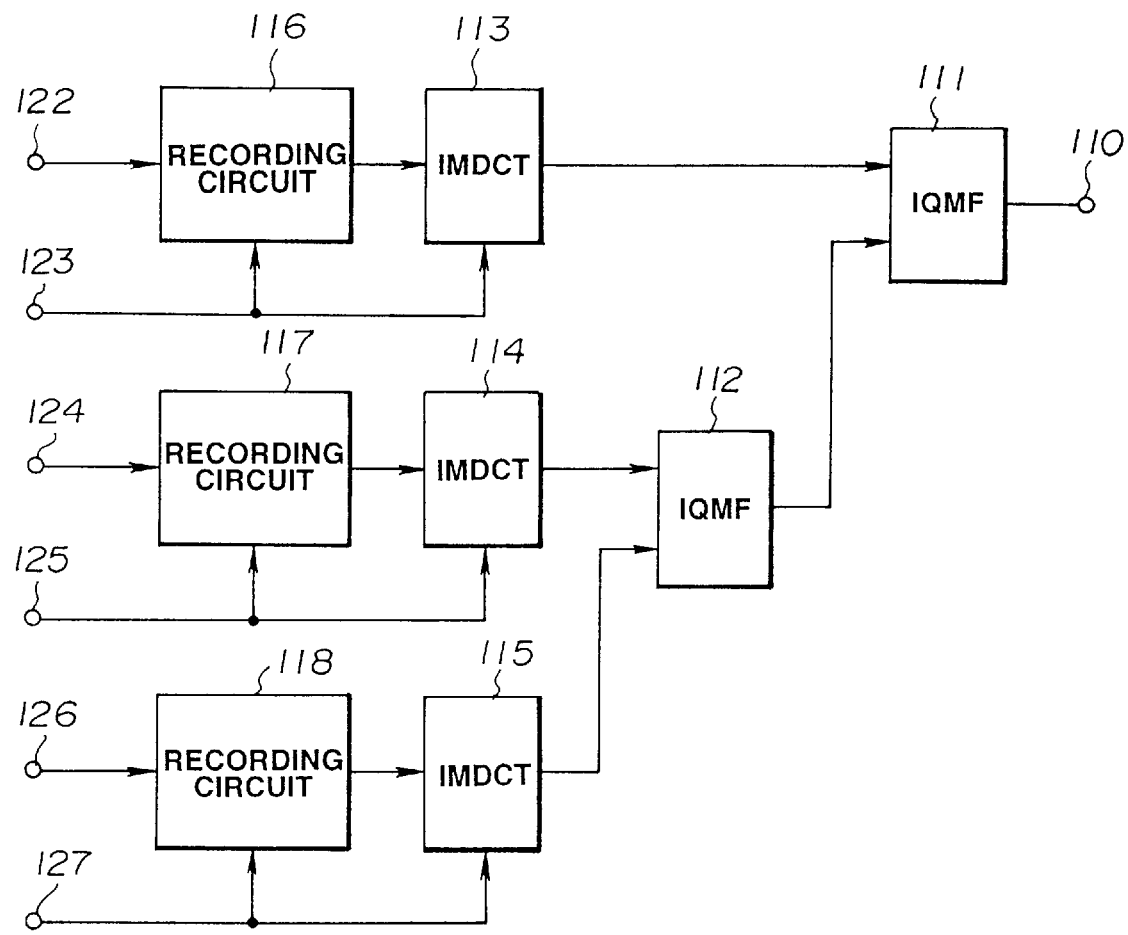
FIG. 20 is a block circuit diagram showing an example of the configuration of a decoding apparatus of an embodiment of this invention.

FIG. 20 shows a fundamental decoding apparatus of an embodiment of this invention for decoding, for a second time, a signal which has been caused to undergo efficient, encoding in this way.

In the FIG. 20 mentioned above, quantized MDCT coefficients in respective bands are delivered to input terminals 122, 124, 126 of the decoding apparatus, and used block size information are delivered to input terminals 123, 125, 127. Decoding circuits 116, 117, 118 release bit allocation by using adaptive bit allocation information consisting of scale factor and word length transmitted along with quantized MDCT coefficients.

Then, at IMDCT circuits 113, 114, 115, signals in the frequency region are transformed into signals in the time region. The time region signals of these partial bands are decoded into an entire band signal by means of IQMF circuits 112, 111.

Namely, signals (samples) by bit allocation of 128 kbps of the basic bit allocation and signals (samples) by bit allocation of 64 kbps of the additional bit allocation are respectively decoded at the decoding circuits 116, 117, 118. After these two decoded portions are respectively decoded in this way, respective samples on the time base are added. Thus, high accuracy samples result.

As a matter of course, in FIG. 20, there may be employed an approach to respectively calculate outputs by the basic bit allocation and outputs by the additional bit allocation with respect to outputs of IMDCT circuits 113, 114, 115 thereafter to synthesize those outputs to send them to IQMF circuits 112, 111.

Further, there may be employed an approach to add, after normalization processing is released, outputs by the basic bit allocation and outputs by the additional bit allocation at the decoding circuits 116, 117, 118 to allow them to undergo IMDCT processing, IQMF processing, thus to obtain a final output.

Recording media of an embodiment of this invention are adapted so that signals quantized and encoded by an efficient encoding apparatus to which a quantizing apparatus of the embodiment of this invention as described above is applied are recorded thereonto or thereinto. As the recording media, there can be enumerated, e.g., disc-shaped recording media on which encoded signals as described above are recorded, such as, for example, optical disc, magneto-optical disc or magnetic disc, etc., tape shaped recording media on which encoded signals as described above are recorded, such as, for example, magnetic tape, and semiconductor memories in which encoded signals as described above are recorded, such as, for example, so called IC cards, etc.

Figure 21:
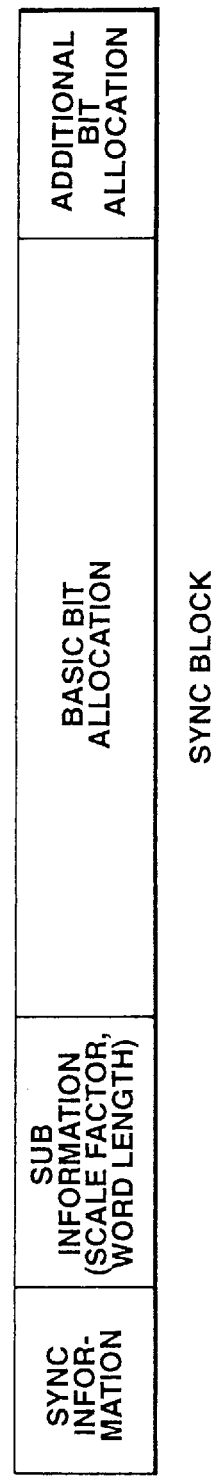
FIG. 21 is a view showing an example of the configuration of bit arrangement (allocation) in recording media of an embodiment of this invention.

Arrangement of data in the recording media of the embodiment of this invention is as shown in FIG. 21. Namely, one sync (synchronization) block consists of sync information, sub information (scale factor, word length), basic bit, allocation, and additional bit allocation.

In this case, by at least one quantizing function adapted to quantize time region samples or frequency region samples thereafter to further quantize, individually by one sample, each quantization error of the preceding stage to thereby decompose the time region sample or the frequency region sample into at least two words to record or transmit them separately with respect to respective quantized outputs into one sync block thereafter to decode and reproduce them is effective in that it is possible to collectively remove bit train portions to be removed in the case of carrying out reproduction at a bit rate caused to be low.

As another method, by at least one quantizing function adapted to quantize time region samples or frequency region samples thereafter to further quantize, individually by one sample, each quantizing error of the preceding stage to thereby decompose the time region sample or the frequency region sample into at least two words to alternately record or transmit, in order of frequency or time, respective quantized outputs into one sync block to decode and reproduce them from the time region samples or the frequency region samples is effective in that it is possible to collectively remove bit train portions to be removed in a form to limit the frequency band in the case of carrying out reproduction at a bit rate caused to low.

Bit arrangement as described above can be applied to, e.g., so called Mini Disc, magnetic tape media, communication media particularly using magneto-optical disc or optical disc.

As is clear from the foregoing description, this invention can provide the following effects or advantages. Namely, (1) At the time of carrying out decode operation by using a bit rate lower than a bit rate used at the time of encode operation, e.g., at the time of diverting, at the encode side, a portion of bits after undergone encode processing to bits for another data transfer, degradation of sound quality is held down to the minimum level.

(2) When a reproducer for carrying out reproducing at a lower bit rate is already used, in introducing a system of good sound quality using a higher bit rate, it is possible to provide a system having backward compatibility with the reproducer for carrying out reproduction at lower bit rate which has been already used.

(3) In the case where there is a need to carry out recording into a storage medium using expensive memory device, e.g., IC card, when there is a need to prolong recording time from an initial setting, bit rate of encode information which has been recorded, or is being recorded is suitably decreased, thus making it possible to prolong such recording time, and to minimize degradation in sound quality at this time.

(4) A high sound quality decoder can be prepared by using inexpensive and commonly used plural decoders for carrying out bit allocation of a lower bit rate. Thus, preparation of new LSI for decoder becomes unnecessary, thereby making it possible to attain the object at a low cost.

What is claimed is:

1. A quantizing apparatus for quantizing time domain samples or frequency domain samples of an input signal, comprising:

samples thereafter to further quantize, individually by one sample, each quantization error at quantization of the preceding stage to thereby decompose the time region sample or the frequency region at least one quantizing means for quantizing the samples; and means for determining a quantization error based upon the samples and the quantized samples, wherein the at least one quantizing means also quantizes the quantization error to thereby decompose the samples into at least two words.

2. A quantizing apparatus as set forth in claim 1, wherein the at least one quantizing means performs a round-off operation.

3. A quantizing apparatus as set forth in claim 1 or 2, wherein an output bit rate of at least one of the quantizing means is a fixed bit rate in predetermined time units.

4. A quantizing apparatus as set forth in claim 3, wherein output bit rates of all the quantizing means are a fixed bit rate in predetermined time units.

5. A quantizing apparatus as set forth in claim 1,
wherein the samples undergo block floating processing for every block of plural samples to determine, from a scale factor for a quantized output of at least a preceding stage, a scale factor for quantizing the quantization error of the preceding stage.

6. A quantizing apparatus as set forth in claim 5,
wherein the scale factor for quantizing the quantization error of the preceding stage is determined from the scale factor and a word length for the quantized output of the at least the preceding stage.

7. A quantizing apparatus as set forth in claim 5,
wherein, with respect to samples within blocks subdivided with respect to time and frequency, quantization having a same block floating and word length is carried out within the subdivided blocks.

8. A decoding apparatus for decoding signals generated by quantizing time domain samples or frequency domain samples, the apparatus comprising:
at least one inverse normalization means for inverse normalizing the quantized samples; and
synthesis means for combining into one sample at least two inverse normalized quantized partial samples, the at least two inverse normalized quantized partial samples relating to samples in the same domain.

9. A decoding apparatus as set forth in claim 8, 12 or 13;
wherein, in the quantization, at least one quantizing means quantizes samples, and thereafter quantizes, individually by one sample, each quantization error of a preceding stage to thereby decompose the sample into at least two words, and
wherein an output bit rate of at least one of the quantizing means is a fixed bit rate in predetermined time units.

10. A decoding apparatus as set forth in claim 9,
wherein, in the quantization, at least one quantizing means quantizes samples, and thereafter quantizes, individually by one sample, each quantization error of a preceding stage to thereby decompose each sample into at least two words, and
wherein output bit rates of all the quantizing means are a fixed bit rate in predetermined time units.

11. A decoding apparatus as set forth in claim 10,
wherein, in the quantization, samples undergo block floating processing every block of plural samples, and
wherein a scale factor for sample data obtained by quantizing each quantization error of the preceding stage is determined from a scale factor for a quantized output of at least the preceding stage.

12. A decoding apparatus for decoding signals obtained by quantizing time domain samples or frequency domain samples, the apparatus comprising:
at least one inverse normalization means for inverse normalizing the quantized samples; and
synthesis means for combining into one sample at least two inverse normalized quantized partial samples, the at least two inverse normalized quantized partial samples relating to samples in the same domain, wherein the samples in the same domain are of an entire bandwidth region.

13. A decoding apparatus adapted for decoding signals obtained by quantizing time domain samples or frequency domain samples, the apparatus comprising:
at least one inverse normalization means for inverse normalizing the quantized samples; and
synthesis means for combining into one sample at least two inverse normalized quantized partial samples, the at least two inverse normalized quantized partial samples relating to samples in the same domain, wherein the samples in the same domain are individual time domain samples of partial bandwidth regions, wherein the combined one sample is a time domain sample of an entire bandwidth region.

14. A quantizing method for quantizing a predetermined sample in the time domain or the frequency domain of an input signal, the method comprising the steps of:
quantizing the predetermined sample to generate a first quantized value;
calculating a quantization error between the predetermined sample and the first quantized value;
quantizing each quantization error individually by one sample to generate a second quantized value; and
outputting the first and second quantized values.

15. A quantizing method as set forth in claim 14,
wherein at least one of the first quantized value and the second quantized value is generated by quantization based upon a round-off operation.

16. A quantizing method as set forth in claim 14,
wherein at least one of the first quantized value and the second quantized value is output at a fixed bit rate.

17. A quantizing method as set forth in claim 14,
wherein the first quantized value and the second quantized value are output so that a total bit rate thereof becomes equal to a fixed bit rate.

18. A quantizing method as set forth in claim 14, the method further comprising the steps of:
allowing the predetermined samples to undergo block floating processing by using a first scale factor for every block comprised of plural samples; and
normalizing the quantization errors by a second scale factor determined on the basis of the first scale factor.

19. A quantizing method as set forth in claim 18,
wherein the second scale factor is determined on the basis of a word length in generating the first scale factor and the first quantized value.

20. A quantizing method as set forth in claim 14,
wherein, with respect to sample data within blocks subdivided with respect to time and frequency, normalization and quantization are performed using a same scale factor and word length within the subdivided blocks.

21. An encoding apparatus for allocating bits to time domain samples or frequency domain samples of an input signal comprising:
at least one quantizing means for quantizing the samples; and
means for determining a quantization error based upon the samples and the quantized samples, wherein the at least one quantizing means also quantizes the quantization error to thereby decompose the samples into at least two words.

22. An encoding apparatus as set forth in claim 21,
wherein the at least one quantizing means performs a round-off operation.

23. An encoding apparatus as set forth in claim 21 or 22,
wherein an output bit rate of at least one of the quantizing means is a fixed bit rate in predetermined time units.

24. An encoding apparatus as set forth in claim 23,
wherein output bit rates of all the quantizing means are a fixed bit rate in predetermined time units.

25. An encoding apparatus as set forth in claim 21,
wherein the samples undergo block floating processing for every block of plural samples to determine, from a scale factor for a quantized output of at least the preceding stage, a scale factor for quantizing the quantization error of the preceding stage.

26. An encoding apparatus as set forth in claim 25, wherein the scale factor for sample data to quantize the quantization error of the preceding stage is determined from the scale factor and a word length for a quantized output of at least the preceding stage.

27. An encoding apparatus as set forth in claim 21, wherein, with respect to sample data within blocks subdivided with respect to time and frequency, quantization having a same block floating or the same block floating and a word length is carried out within the subdivided blocks.

28. An encoding apparatus adapted for carrying out bit allocation for time domain samples or frequency domain samples of an input signal to encode the input signal for recording the encoded signal onto or into a recording medium, comprising:

at least one quantizing means for quantizing the samples;

means for determining a quantization error based upon the samples and the quantized samples, wherein the at least one quantizing means also quantizes the quantization error to thereby decompose the samples into at least two words; and means for separately recording in predetermined time units, output samples of all the quantizing means into one sync block.

29. An encoding apparatus adapted for carrying out bit allocation for time domain samples or frequency domain samples of an input signal to encode the input signal to record the encoded signal onto or into a recording medium, comprising:

at least one quantizing means for quantizing the samples;

means for determining a quantization error based upon the samples and the quantized samples, wherein the at least one quantizing means also quantizes the quantization error to thereby decompose the samples into at least two words; and means for alternately recording, into one sync block, output samples of respective ones of the quantizing means in order of one of time and frequency for every respective quantizing means.

30. A code decoding apparatus for decoding signals encoded after undergoing bit allocation for time domain samples or frequency domain samples, comprising:

at least one inverse normalization means for inverse normalizing the quantized samples; and synthesis means for combining into one sample at least two inverse normalized quantized partial samples, the at least two inverse normalized quantized partial samples relating to samples of the same domain.

31. A code decoding apparatus as set forth in claim 30, 34 or 35, wherein a bit rate of at least one of the encoded signals is a fixed bit rate in predetermined time units.

32. A code decoding apparatus as set forth in claim 31, wherein bit rates of all the encoded signals are a fixed bit rate in predetermined time units.

33. A code decoding apparatus as set forth in claim 32, wherein, with respect to the encoded signal, domain samples undergo block floating processing for every block of plural samples to determine, from a scale factor for a quantized output obtained by quantizing at least one domain sample, a scale factor for sample data obtained by quantizing a quantization error of the preceding stage.

34. A code decoding apparatus adapted for decoding signals encoded after undergoing bit allocation for time domain samples or frequency domain samples, comprising:

at least one inverse normalization means for inverse normalizing the quantized samples; and synthesis means for combining into one sample at least two partial samples, the at least two inverse normalized partial samples relating to samples of the same domain, wherein the samples in the same domain are of an entire bandwidth region.

35. A code decoding apparatus adapted for decoding signals encoded after undergoing bit allocation for time domain samples or frequency domain samples, comprising:

at least one inverse normalization means for inverse normalizing the quantized samples; and synthesis means for combining into one sample at least two inverse normalized quantized partial samples, the at least two inverse normalized quantized partial samples relating to samples of the same domain, wherein the samples in the same domain are individual samples of partial bandwidth regions, wherein the combined one sample is a time domain sample of an entire bandwidth region.

36. A code decoding apparatus as set forth in claim 30, wherein sample data which undergo quantization having a same block floating or the same block floating and a word length within blocks subdivided with respect to time and frequency is decoded.

37. An encoding method for encoding an input signal, comprising the steps of:

dividing a total bit allocation into a basic bit allocation and an additional bit allocation;

quantizing a predetermined sample of at least one of a time domain and a frequency domain of the input signal by a word length based on the basic bit allocation to generate a first quantized value;

calculating a quantization error between the predetermined sample and the first quantized value; and quantizing each quantization error individually by one sample to generate a second quantized value as the additional bit allocation.

38. An encoding method as set forth in claim 37, wherein at least one of the first quantized value and the second quantized value is generated by quantization based on a round-off operation.

39. An encoding method as set forth in claim 37, wherein at least one of the first quantized value and the second quantized value is output at a fixed bit rate.

40. An encoding method as set forth in claim 37, wherein the first quantized value and the second quantized value are output so that a total bit rate thereof becomes a fixed bit rate.

41. An encoding method as set forth in claim 37, the method further comprising the steps of:

allowing the predetermined samples to undergo block floating processing by using a first scale factor for every block comprised of plural samples; and normalizing the quantization errors by a second scale factor determined on the basis of the first scale factor.

42. An encoding method as set forth in claim 37, wherein the second scale factor is determined on the basis of a word length in generating the first scale factor and the first quantized value.

43. An encoding method as set forth in claim 37, wherein, with respect to sample data within blocks subdivided with respect to time and frequency, normalization and quantization are performed using a same scale factor and word length within the subdivided blocks.

* * * * *

UNITED STATES PATENT AND TRADEMARK OFFICE
CERTIFICATE OF CORRECTION

PATENT NO.: 5,774,844
DATED: June 30, 1998
INVENTOR(S): KENZO AKAGIRI

It is certified that an error appears in the above-identified patent and that said Letters Patent is hereby corrected as shown below:

In Col. 20, please delete lines 48-51.

Signed and Sealed this

Tenth Day of November 1998

BRUCE LEHMAN

Attest:

Attesting Officer

Commissioner of Patents and Trademarks